INVENTOR.
ARTHUR H. DICKINSON
BY
ATTORNEY

Aug. 13, 1957   A. H. DICKINSON   2,802,625
ELECTRONIC MULTIPLYING AND DIVIDING MACHINE
Filed Oct. 16, 1953   26 Sheets-Sheet 2

FIG. 2 DIVISION

INVENTOR.
ARTHUR H. DICKINSON
BY
ATTORNEY

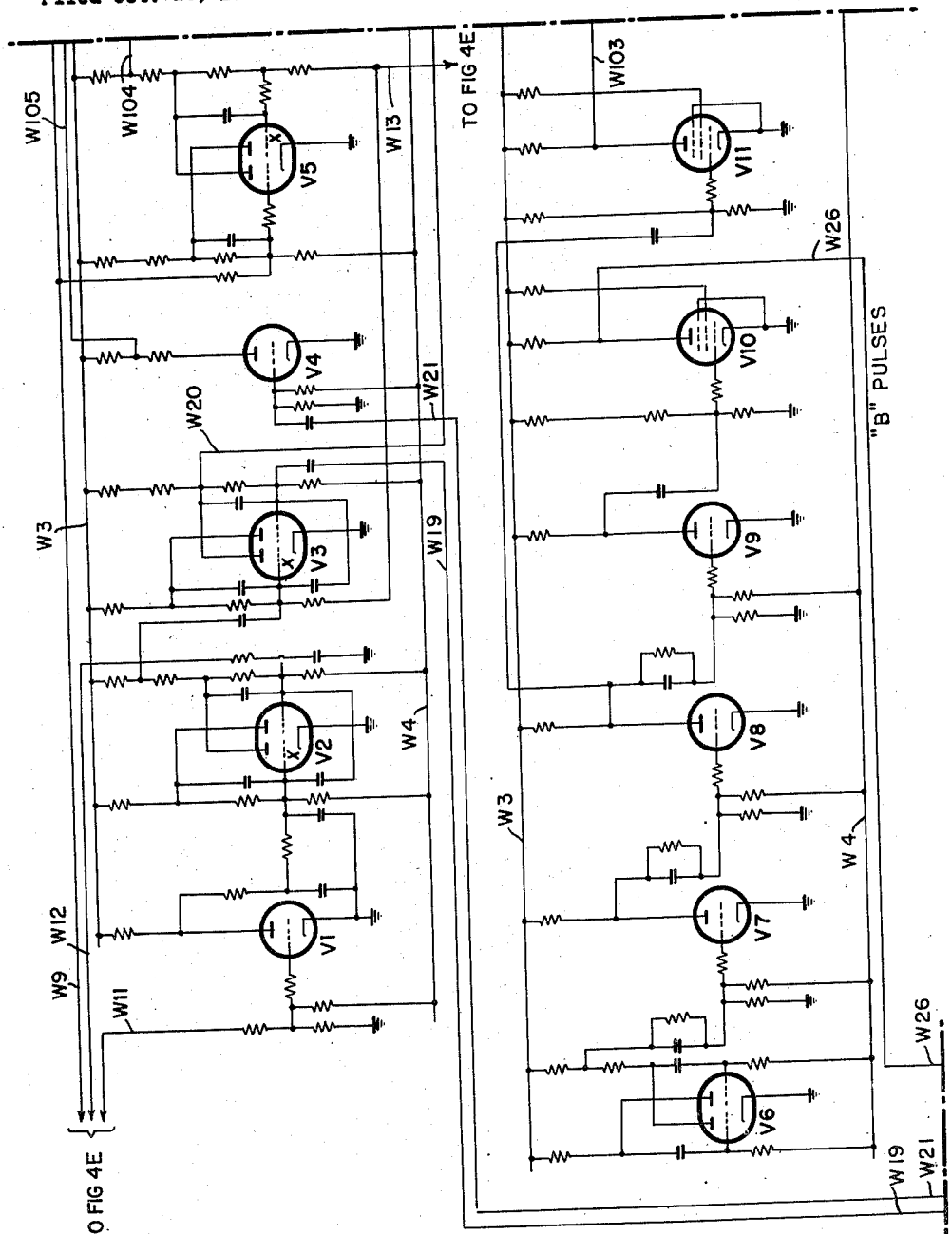

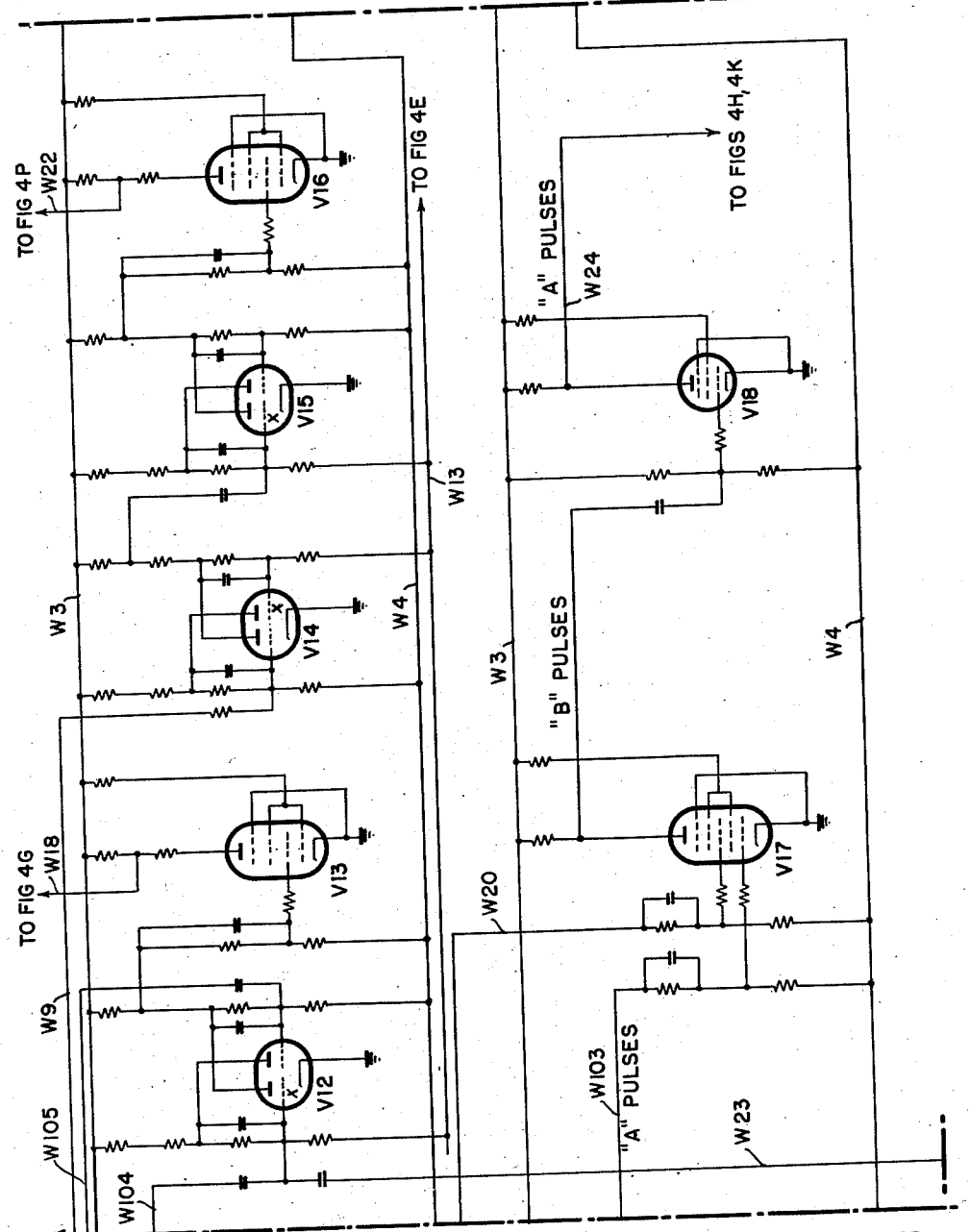

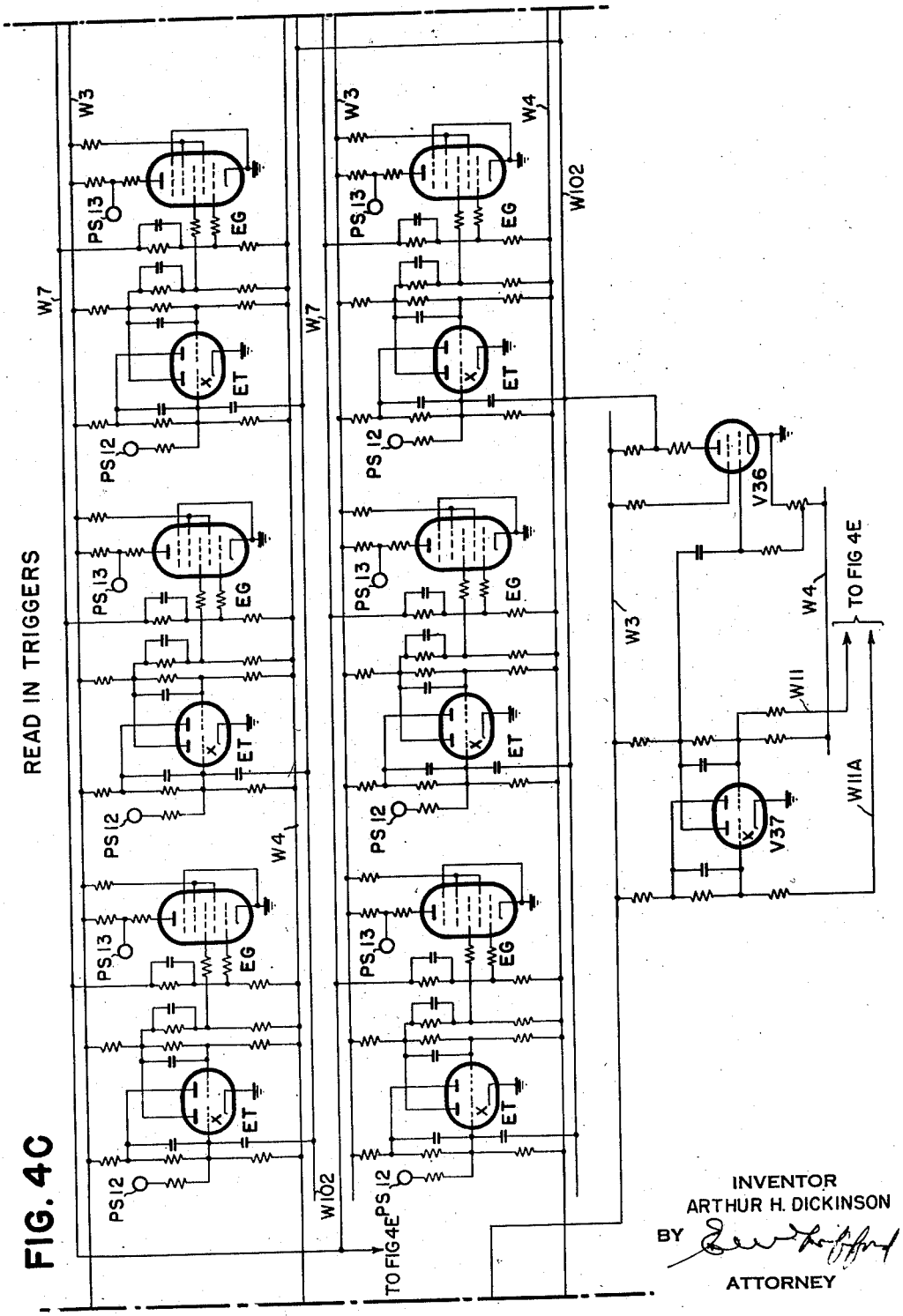

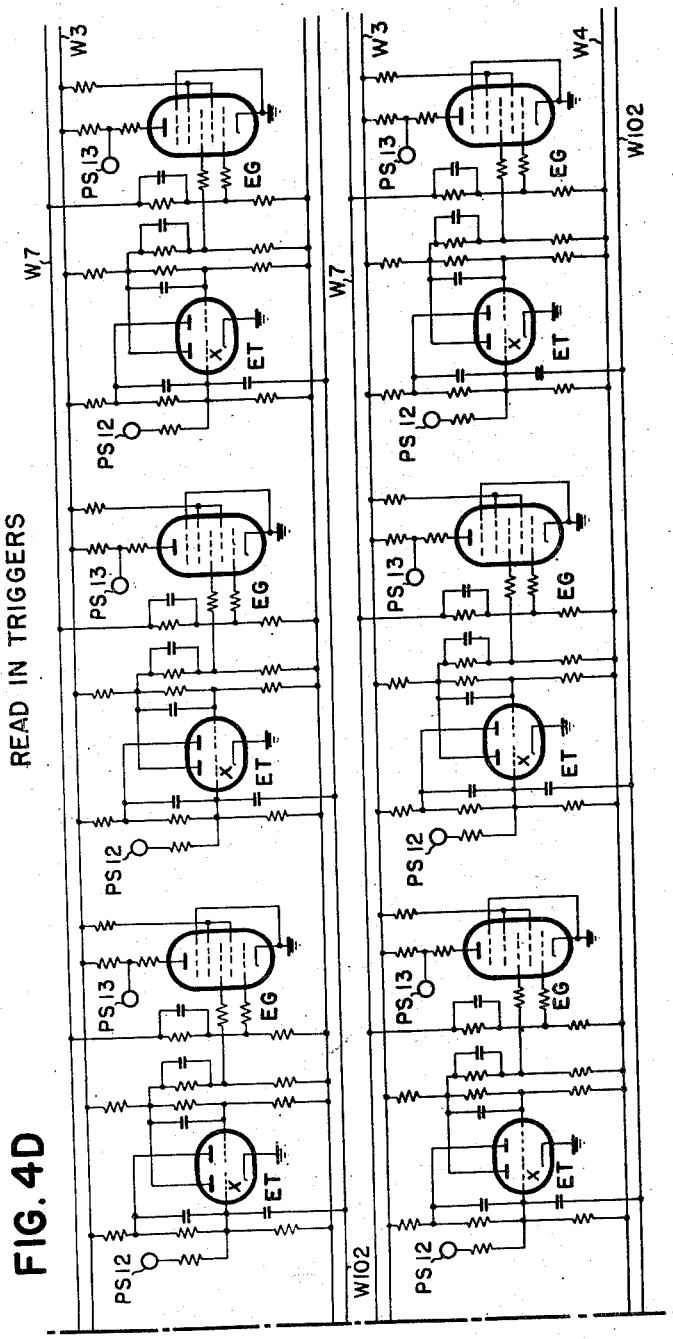

Aug. 13, 1957  A. H. DICKINSON  2,802,625
ELECTRONIC MULTIPLYING AND DIVIDING MACHINE
Filed Oct. 16, 1953  26 Sheets-Sheet 8

INVENTOR.
ARTHUR H. DICKINSON
BY
ATTORNEY

INVENTOR.
ARTHUR H. DICKINSON
BY
ATTORNEY

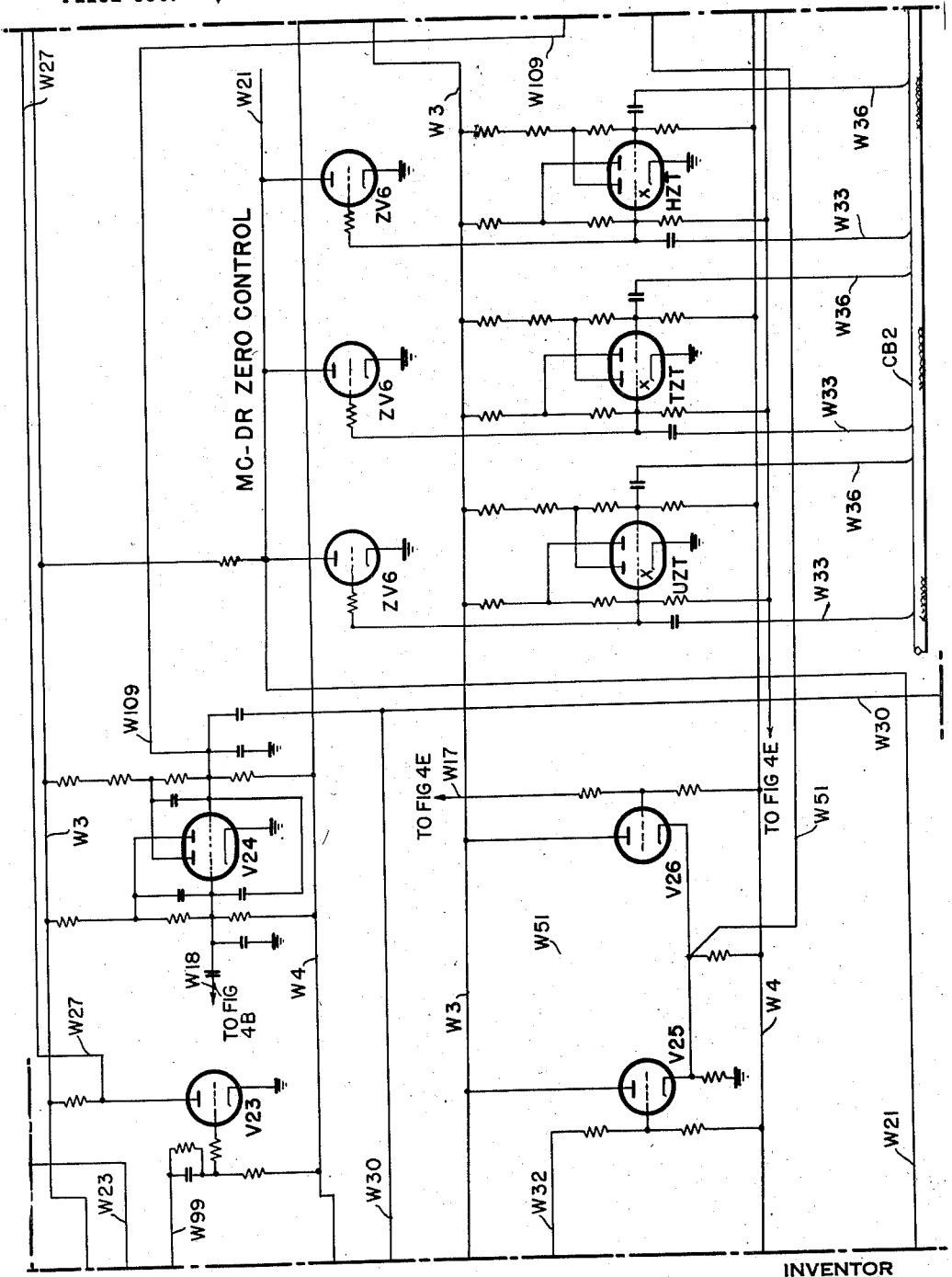

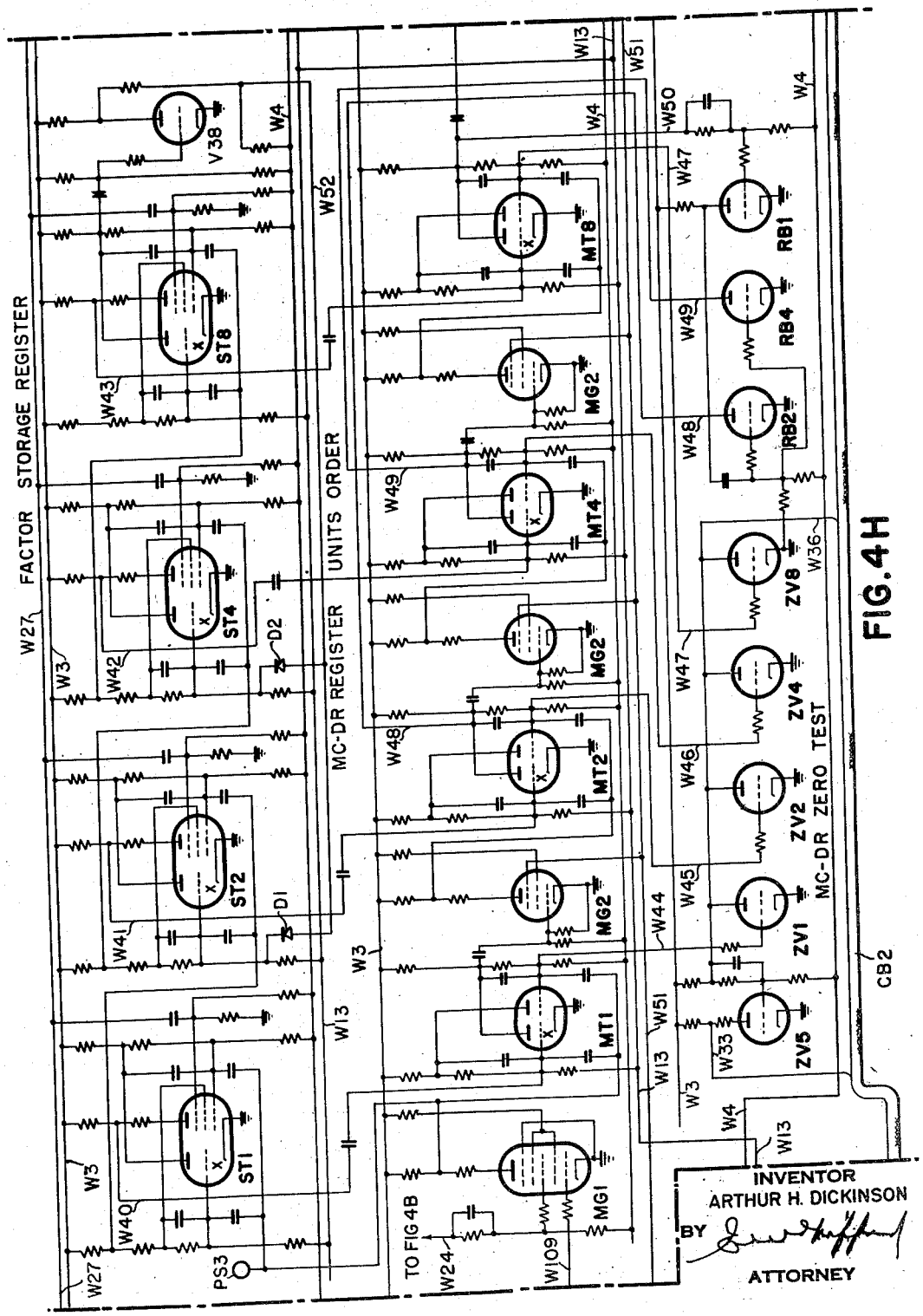

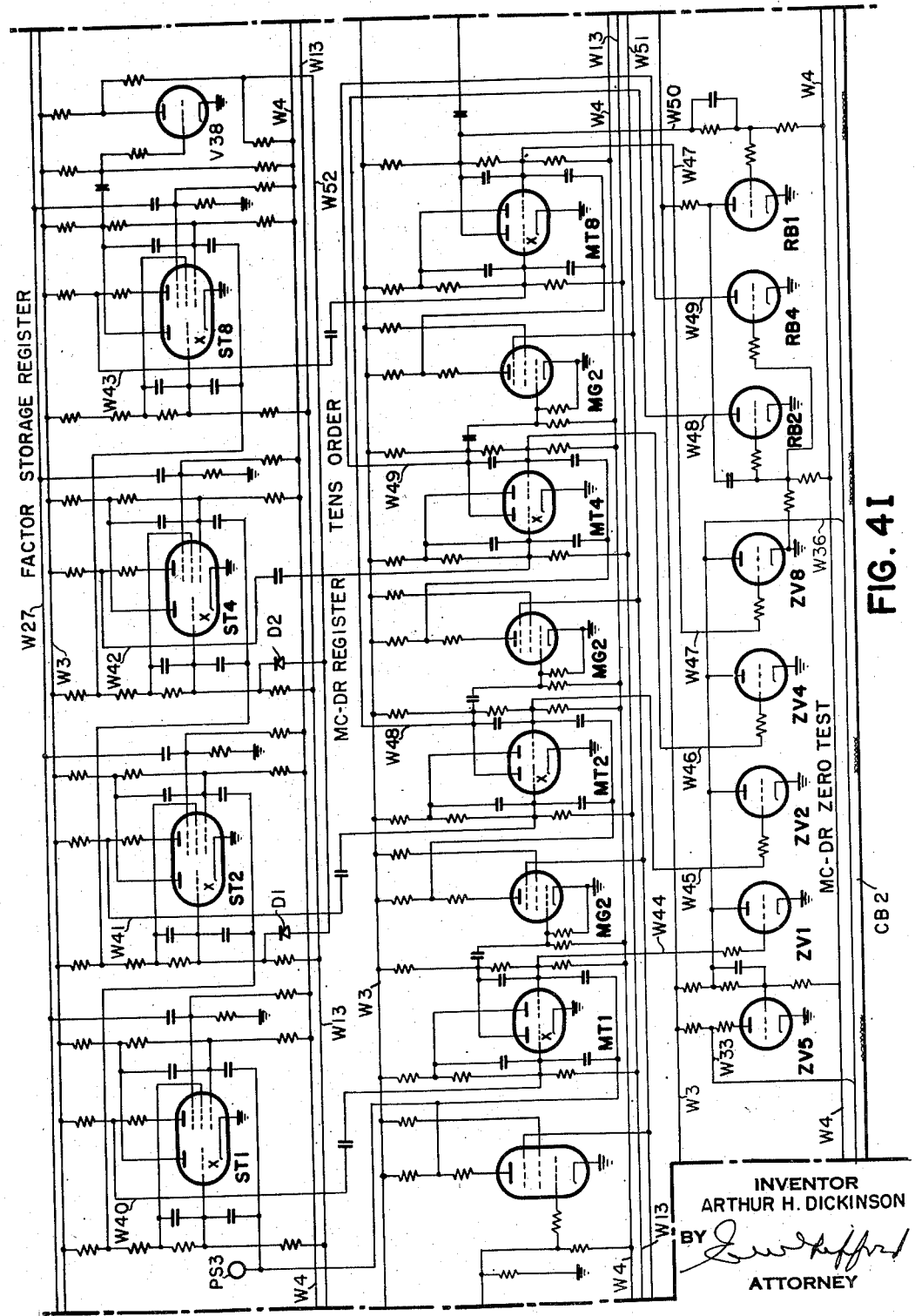

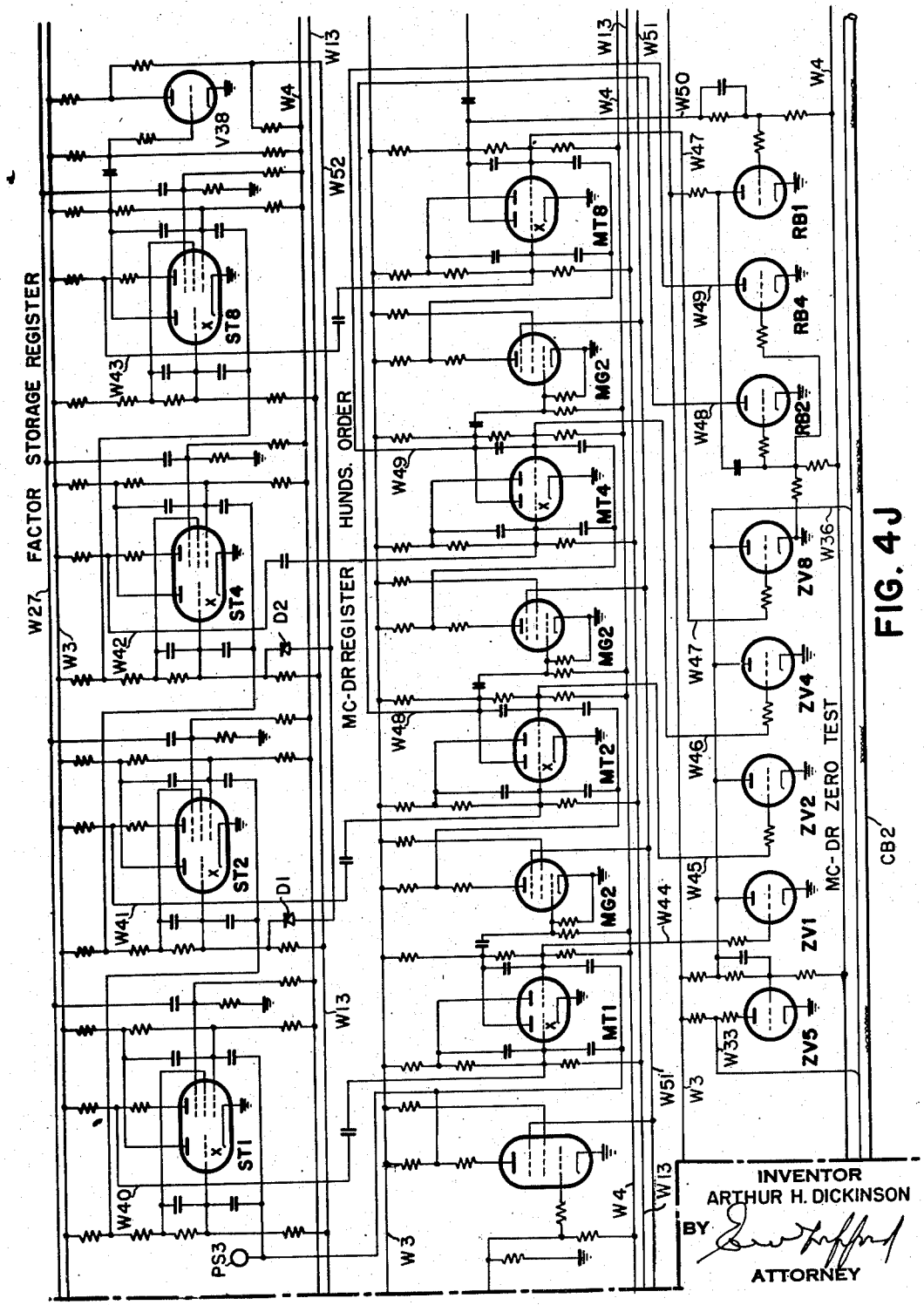

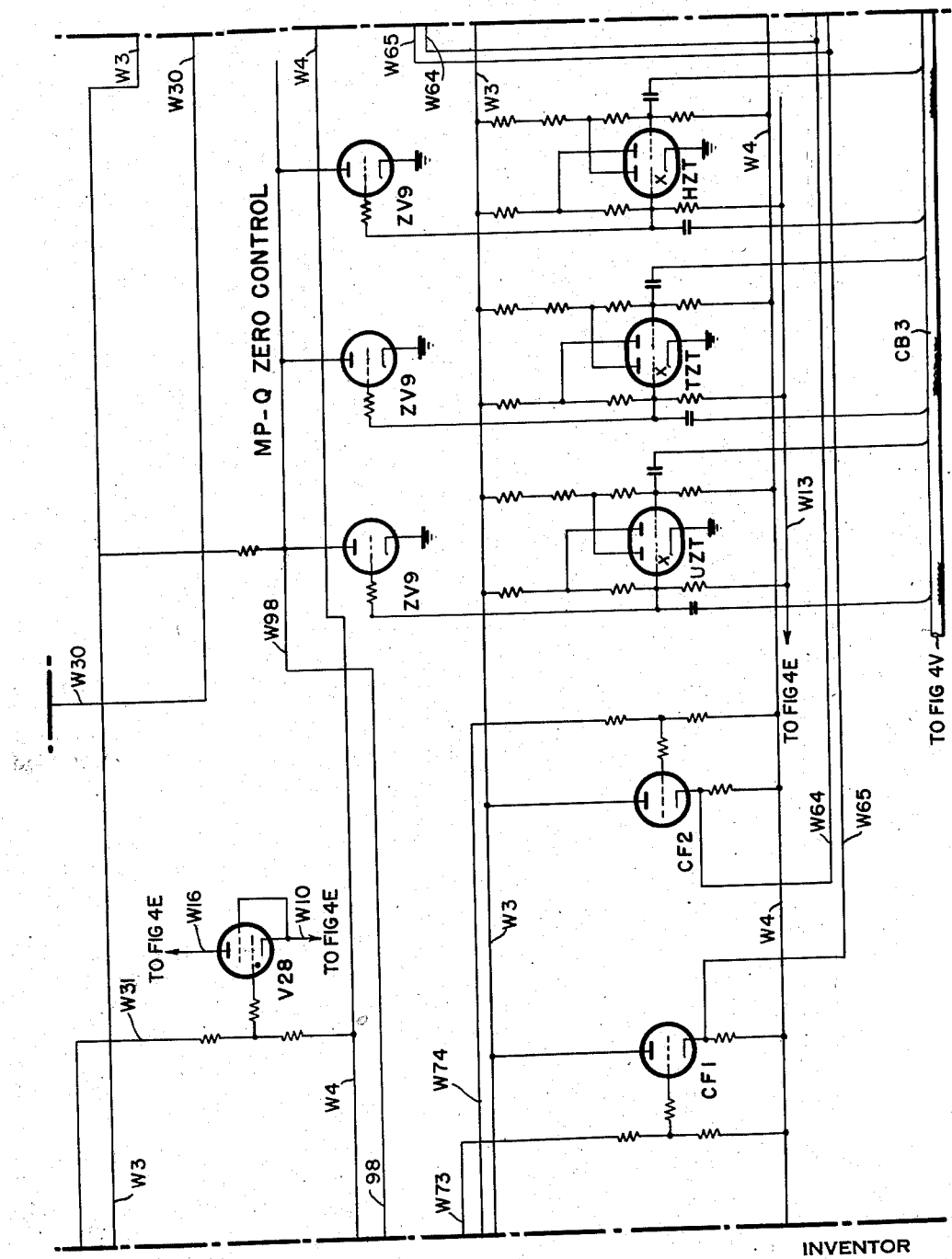

Aug. 13, 1957  A. H. DICKINSON  2,802,625
ELECTRONIC MULTIPLYING AND DIVIDING MACHINE
Filed Oct. 16, 1953  26 Sheets-Sheet 17

INVENTOR
ARTHUR H. DICKINSON
BY
ATTORNEY

Aug. 13, 1957  A. H. DICKINSON  2,802,625
ELECTRONIC MULTIPLYING AND DIVIDING MACHINE
Filed Oct. 16, 1953  26 Sheets-Sheet 18

FIG. 40

INVENTOR
ARTHUR H. DICKINSON
BY
ATTORNEY

Aug. 13, 1957  A. H. DICKINSON  2,802,625
ELECTRONIC MULTIPLYING AND DIVIDING MACHINE
Filed Oct. 16, 1953  26 Sheets-Sheet 20

INVENTOR
ARTHUR H. DICKINSON
BY
ATTORNEY

Aug. 13, 1957  A. H. DICKINSON  2,802,625
ELECTRONIC MULTIPLYING AND DIVIDING MACHINE
Filed Oct. 16, 1953  26 Sheets-Sheet 21

INVENTOR
ARTHUR H. DICKINSON
BY
ATTORNEY

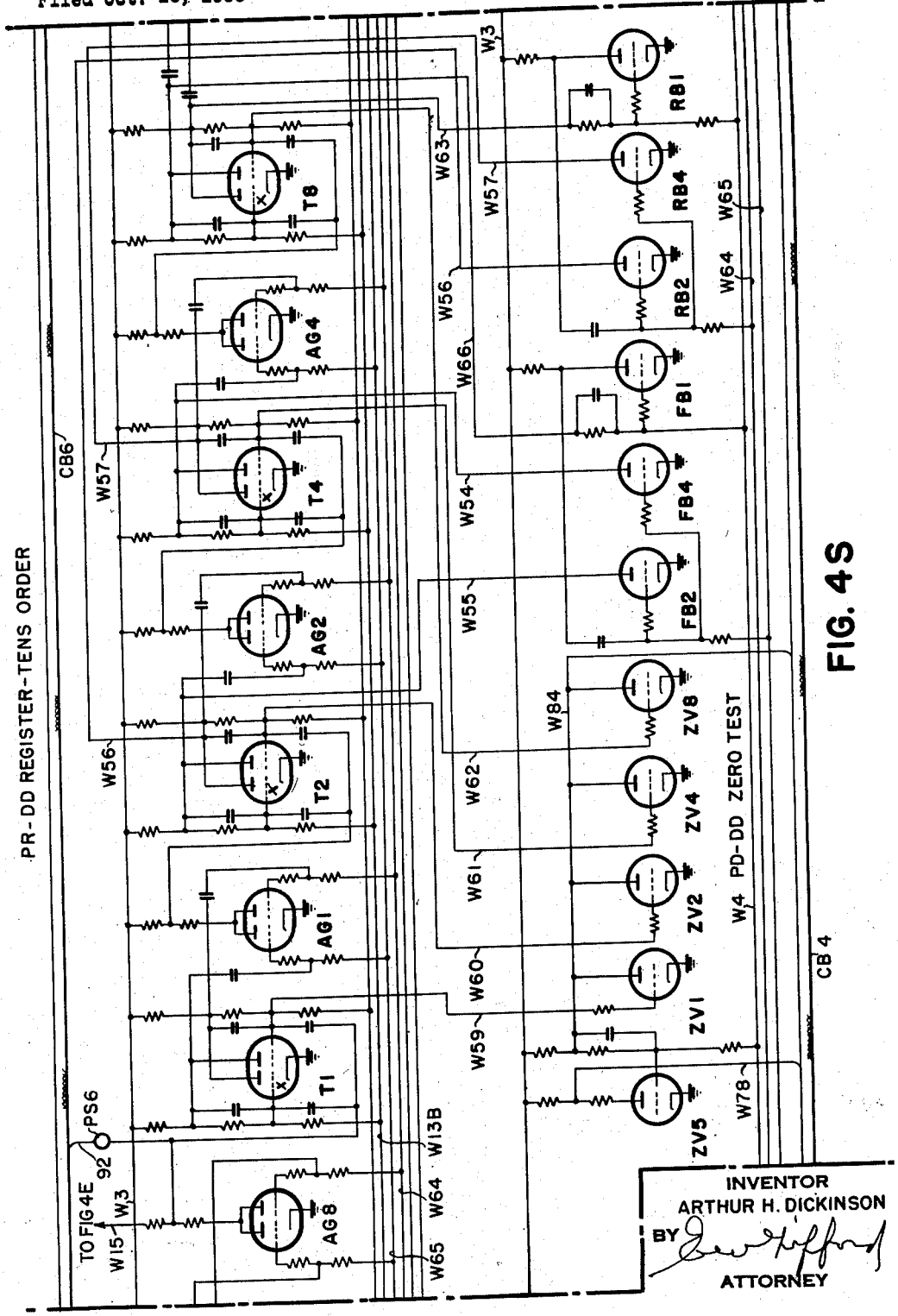

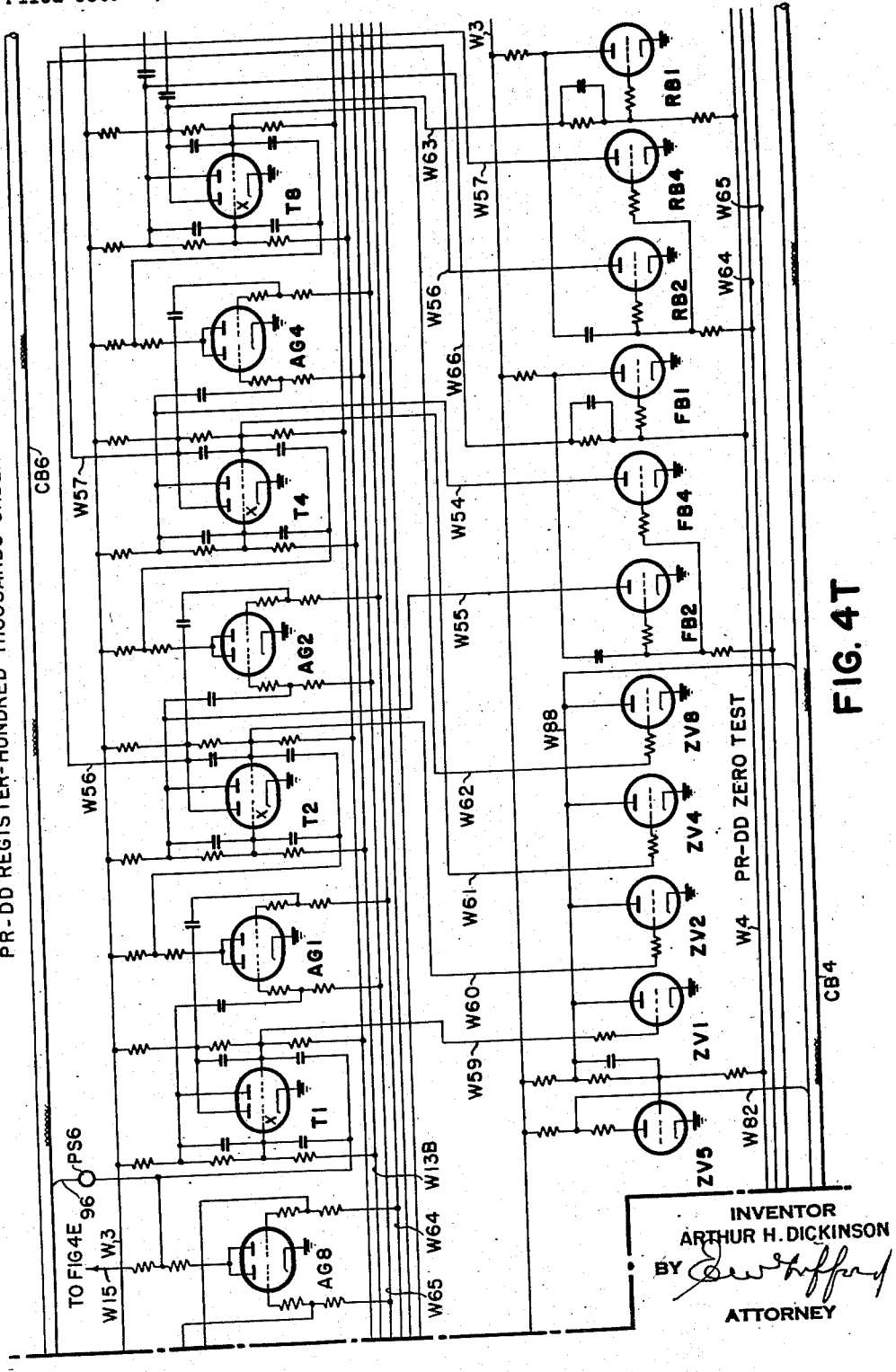

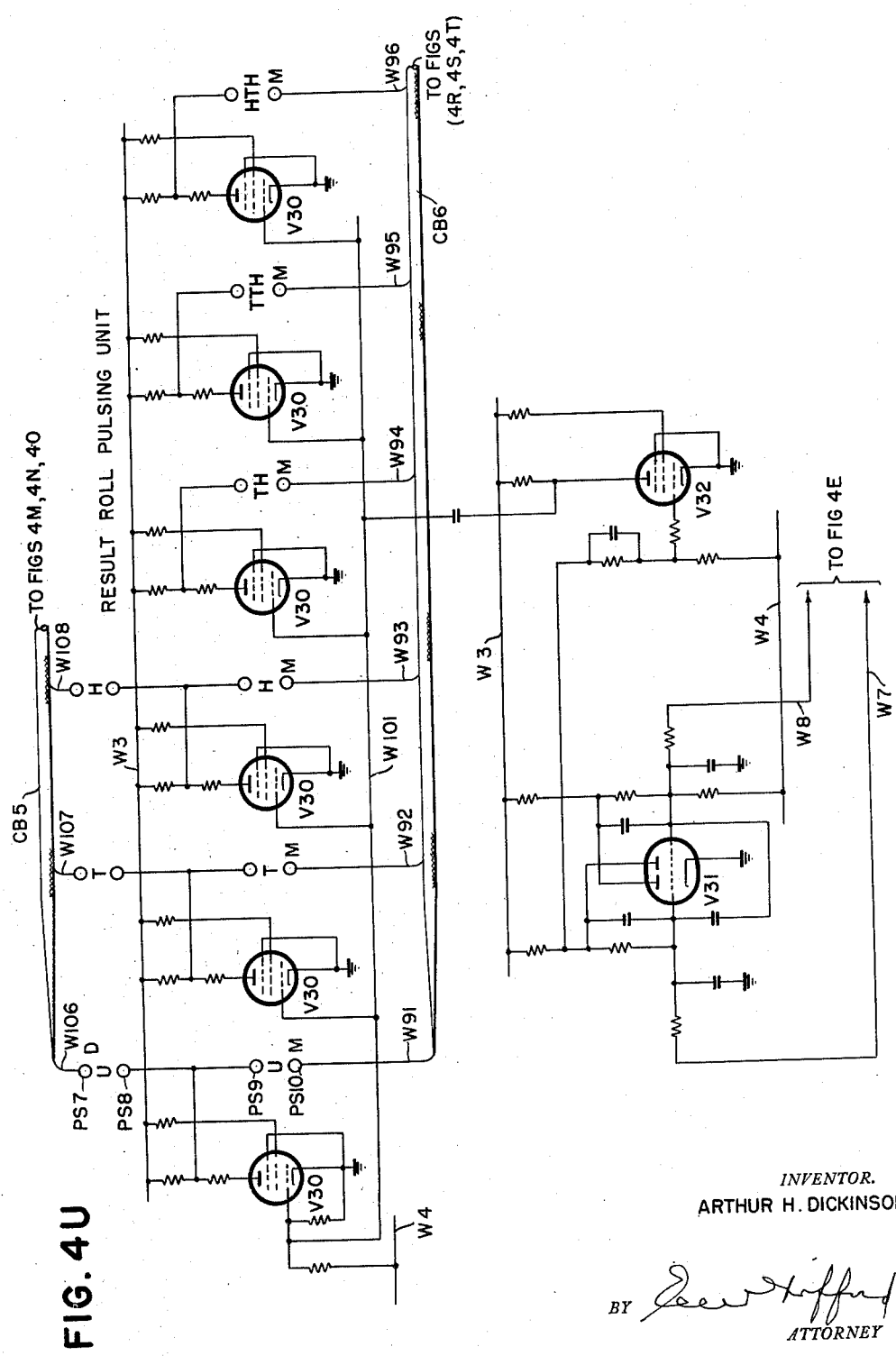

Aug. 13, 1957   A. H. DICKINSON   2,802,625
ELECTRONIC MULTIPLYING AND DIVIDING MACHINE
Filed Oct. 16, 1953   26 Sheets-Sheet 25

INVENTOR.
ARTHUR H. DICKINSON
BY
ATTORNEY

Aug. 13, 1957     A. H. DICKINSON     2,802,625
ELECTRONIC MULTIPLYING AND DIVIDING MACHINE
Filed Oct. 16, 1953     26 Sheets-Sheet 26

FIG 5

| FIG. 4A: MC-DR START MASTER OSCILLATOR AND CLIPPER | FIG. 4B: PR-DD START "A" PULSE GATE AND POWER TUBE | FIG. 4C: READ IN TRIGGERS- MC-DR AND MP-Q REGISTERS | FIG. 4D: READ IN TRIGGERS- PR-DD REGISTER | FIG. 4E: RECORD PERFORATING MACHINE |
|---|---|---|---|---|
| | FIG. 4F: | FIG. 4G: MC TRANSFER INVERTER / MC-DR ALL "0" CONTROL | FIG. 4H: ONE POSITION OF FACTOR STORAGE UNITS ORDER OF MC-DR REGISTER ZERO TEST FOR MC-DR REGISTER | FIG. 4I: ONE POSITION OF FACTOR STORAGE TENS ORDER OF MC-DR REGISTER ZERO TEST FOR MC-DR REGISTER | FIG. 4J: ONE POSITION OF FACTOR STORAGE HUNDREDS ORDER OF MC-DR REGISTER ZERO TEST FOR MC-DR REGISTER |
| | FIG. 4K: | FIG. 4L: UNFINISHED CALCULATION INTERLOCK ADD-SUBTR BIAS TUBES / MP-Q ALL "0" CONTROL | FIG. 4M: UNITS ORDER OF MP-Q REGISTER ZERO TEST FOR MP-Q REGISTER | FIG. 4N: TENS ORDER OF MP-Q REGISTER ZERO TEST FOR MP-Q REGISTER | FIG. 4O: HUNDREDS ORDER OF MP-Q REGISTER ZERO TEST FOR MP-Q REGISTER |
| | FIG. 4P: | FIG. 4Q: ADD-SUBTR BIAS TUBES / PR-DD ALL "0" CONTROL | FIG. 4R: UNITS ORDER OF PR-DD REGISTER ZERO TEST FOR PR-DD REGISTER | FIG. 4S: TENS ORDER OF PR-DD REGISTER ZERO TEST FOR PR-DD REGISTER | FIG. 4T: HUNDRED THOUSANDS ORDER OF PR-DD REGISTER ZERO TEST FOR PR-DD REGISTER |
| | FIG. 4U: RESULT ROLL PULSING UNIT | FIG. 4V: READOUT PULSING UNIT AND POWER TUBES | | | |

INVENTOR.
ARTHUR H. DICKINSON
BY *[signature]*
ATTORNEY

United States Patent Office 2,802,625
Patented Aug. 13, 1957

2,802,625

ELECTRONIC MULTIPLYING AND DIVIDING MACHINE

Arthur H. Dickinson, Greenwich, Conn., assignor to International Business Machines Corporation, New York, N. Y., a corporation of New York Application October 16, 1953, Serial No. 386,462

17 Claims. (Cl. 235—61)

This invention relates to calculating machines and more particularly to electronic multiplying and dividing machines.

The invention has for its principal object to provide an improved electronic multiplying and dividing machine.

An object is to provide an electronic multiplying and dividing machine of greatly simplified construction.

An object is to provide an electronic calculating machine which eliminates the necessity for a complex electronic column shift control.

Another object is to provide an electronic calculating circuit which operates on a non-cyclic basis thereby eliminating the complex electronic commutator usually required in cyclic calculators.

Another object is to provide an electronic multiplying and dividing machine which reduces to a minimum the number of special electronic controls necessary to carry out multiplication and division.

Other objects of the invention will be pointed out in the following description and claims and illustrated in the accompanying drawings, which disclose, by way of example, the principle of the invention and the best mode, which has been contemplated, of applying that principle.

Figure 4E:
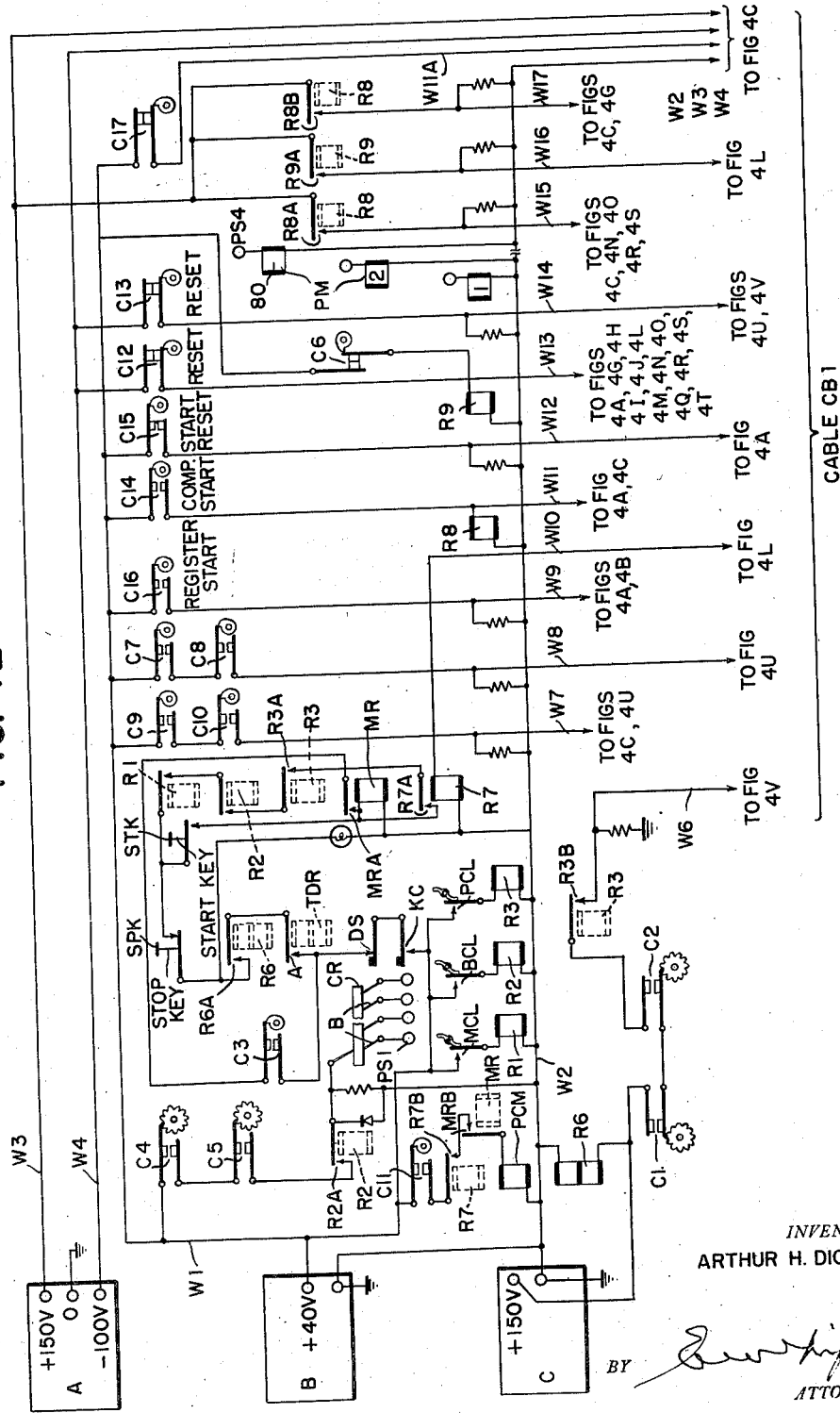
Figure 4F:
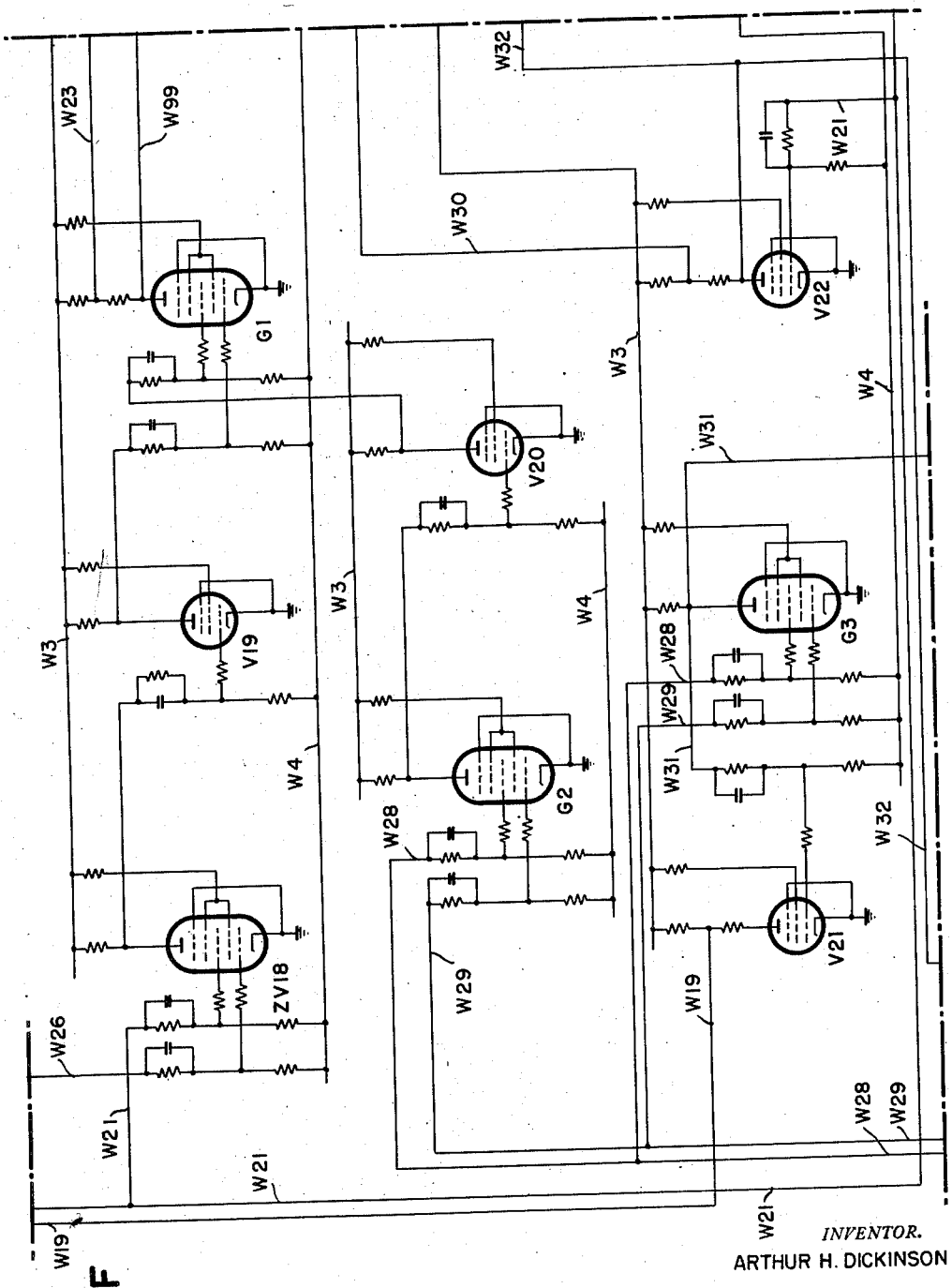
Figure 4K:
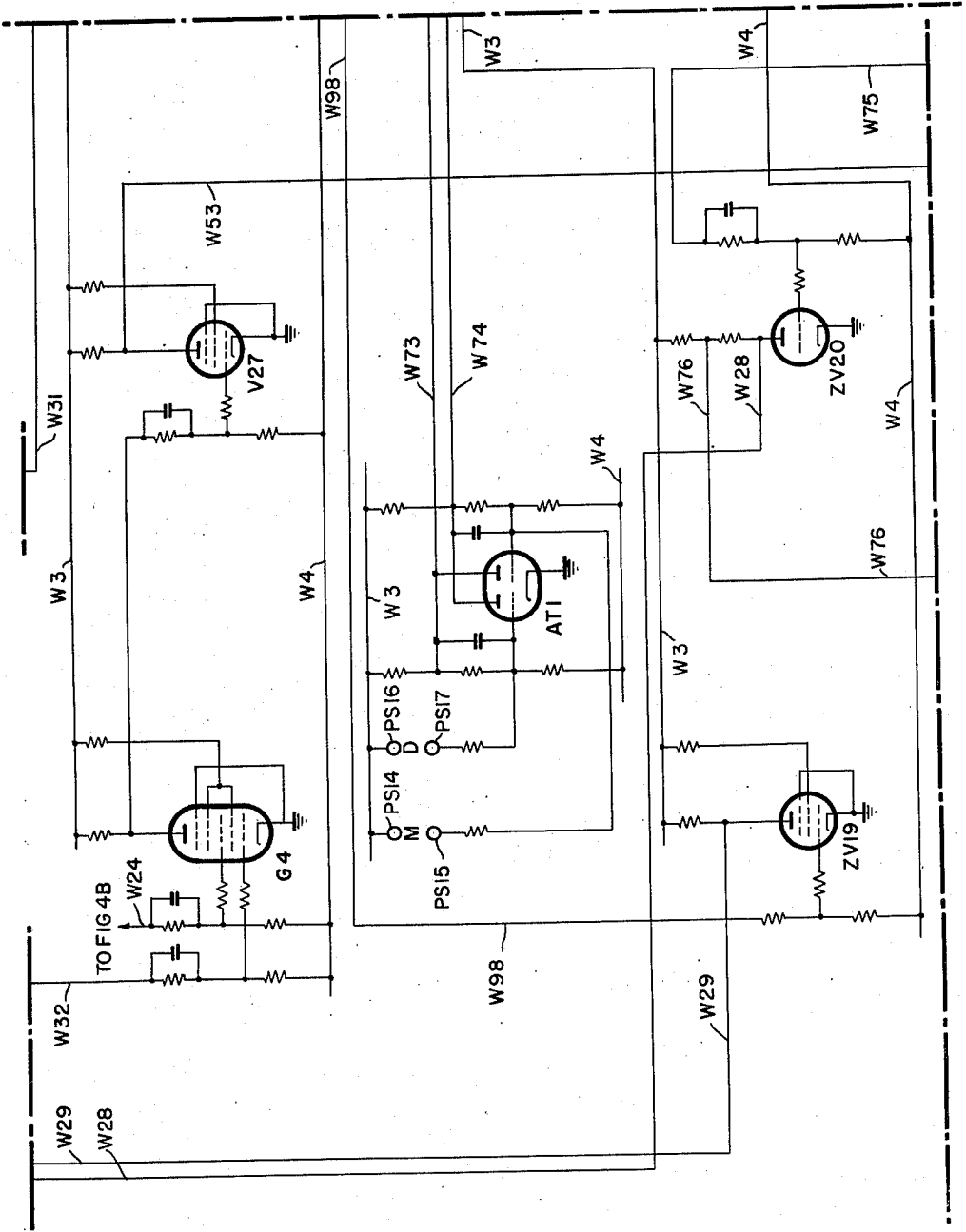
Figure 4M:
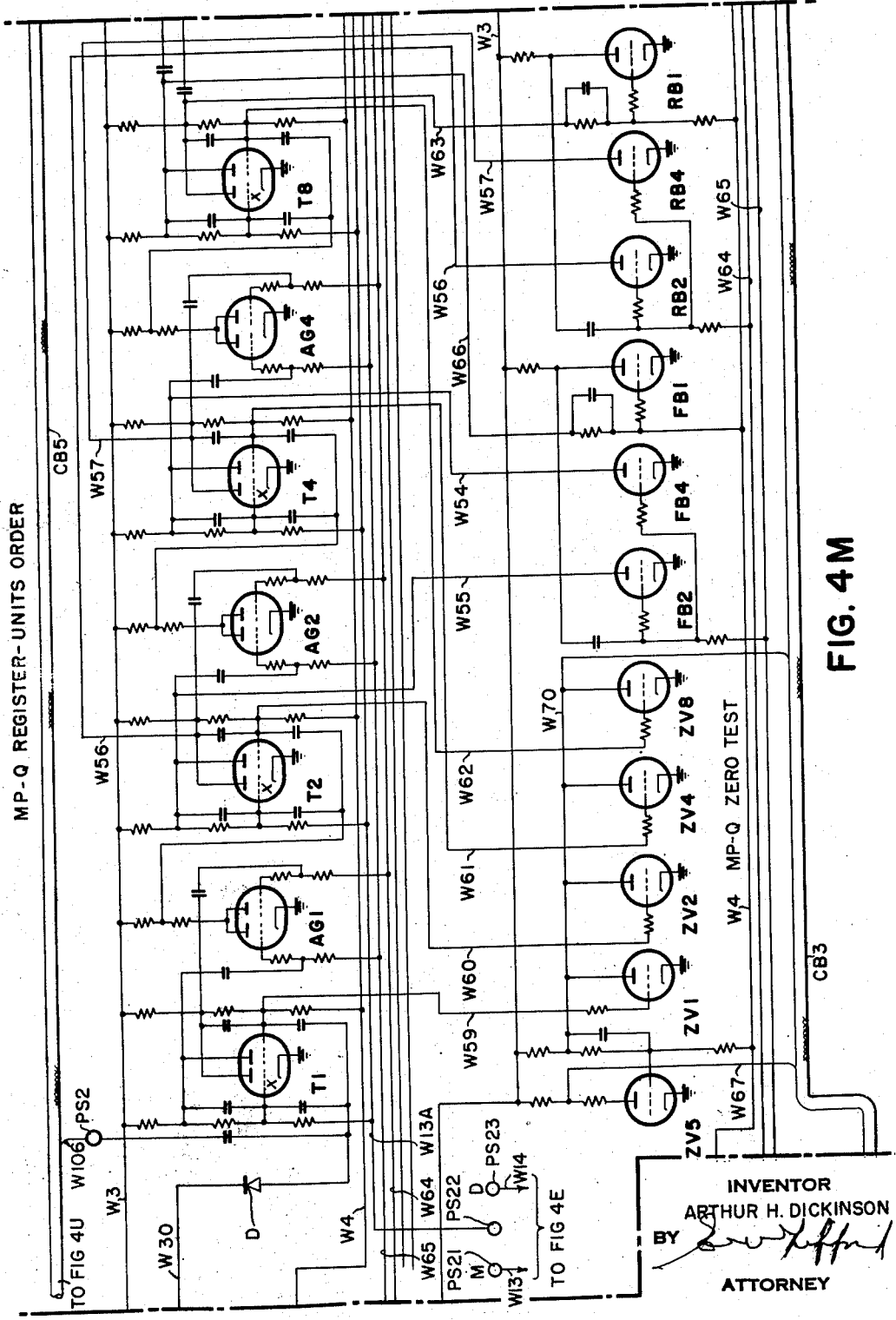
Figure 4N:
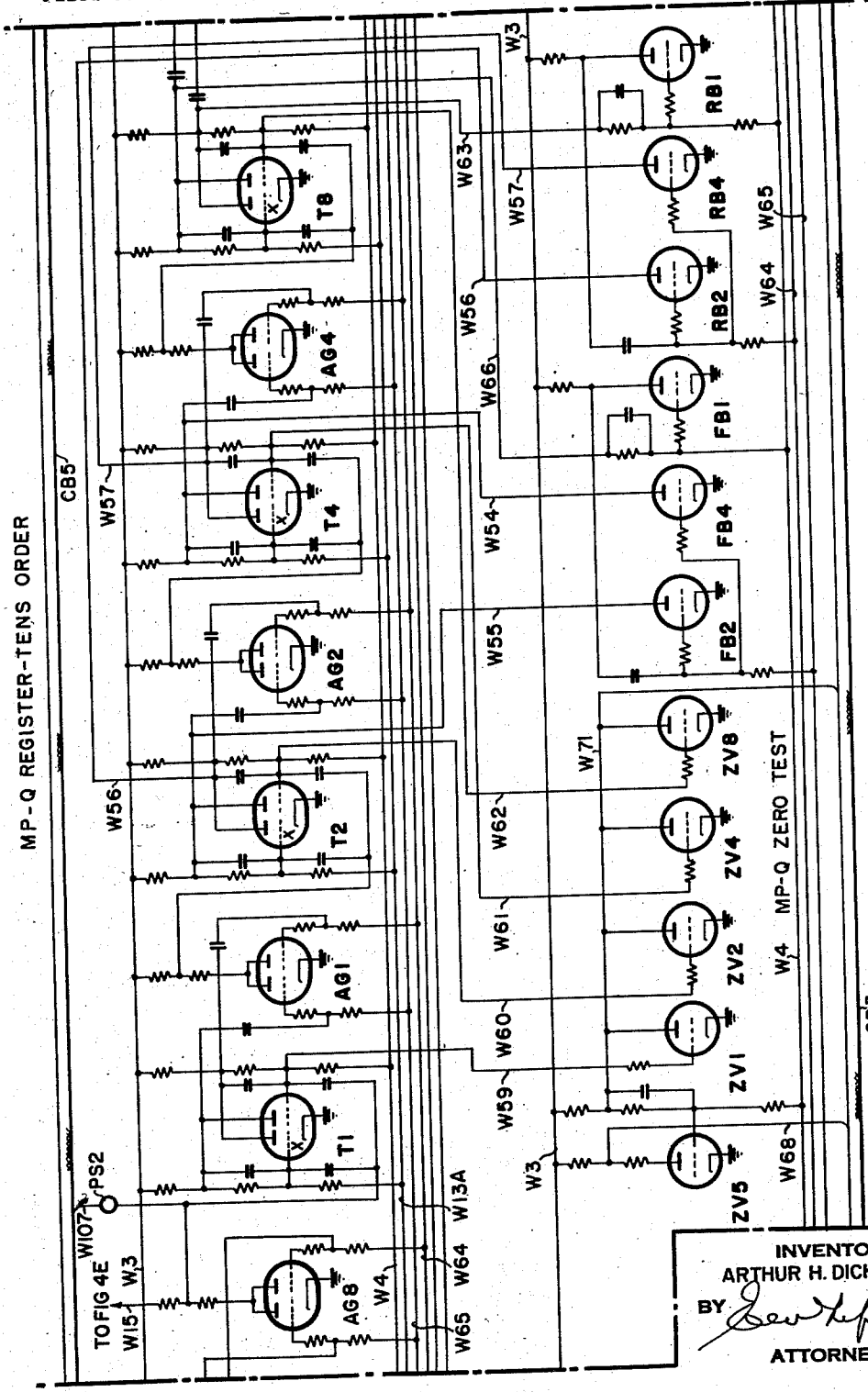
Figure 4P:
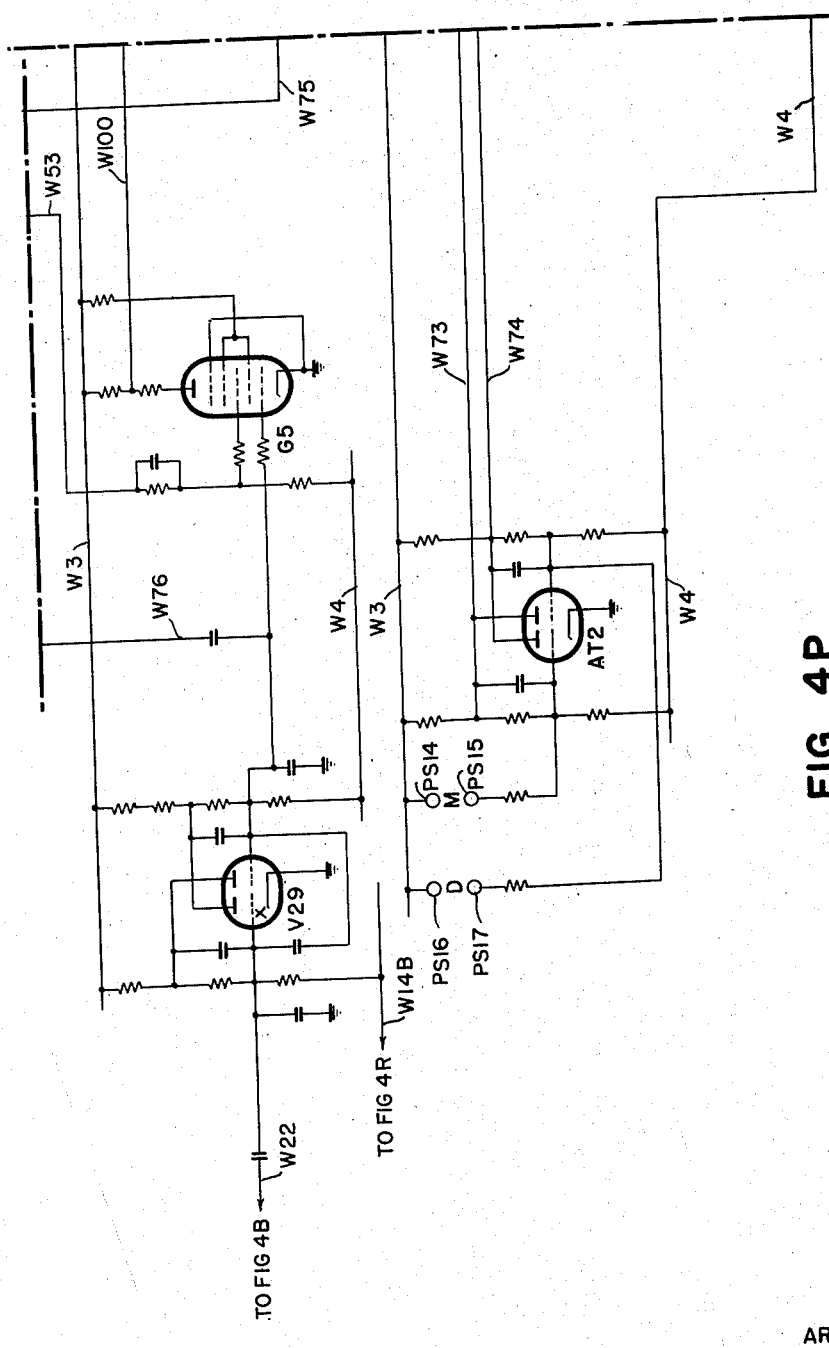
Figure 4Q:
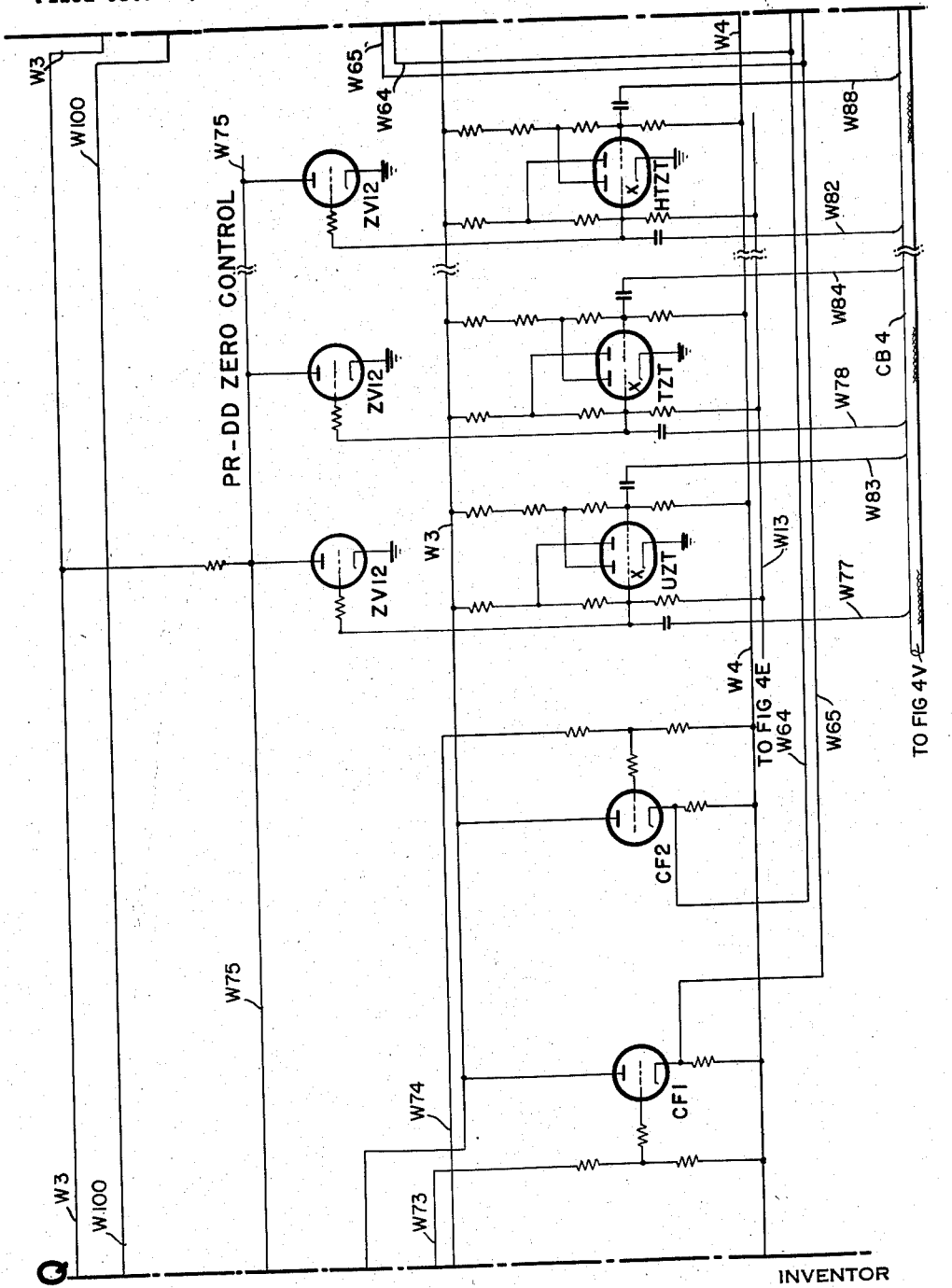
Figure 4R:
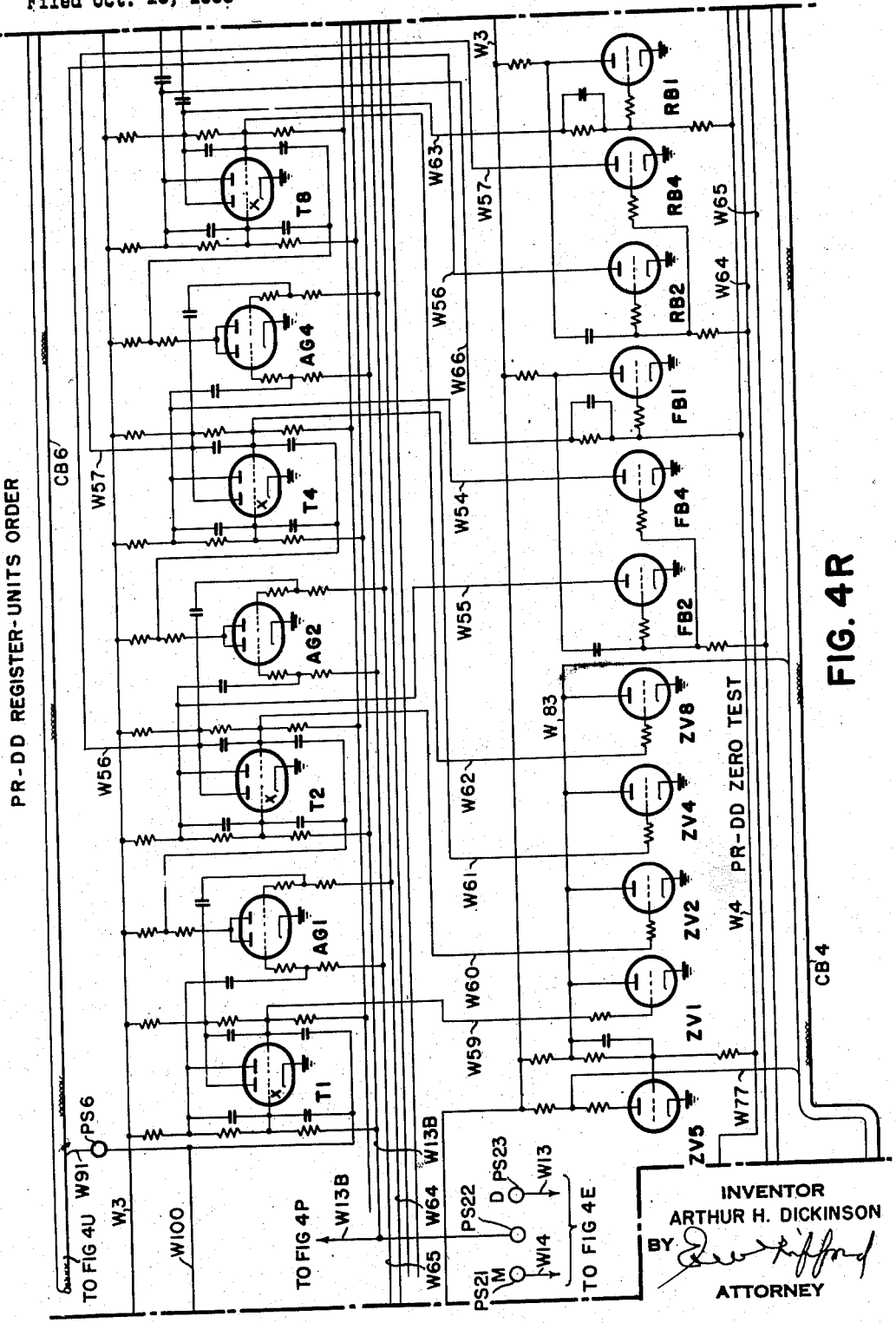
Figure 4V:
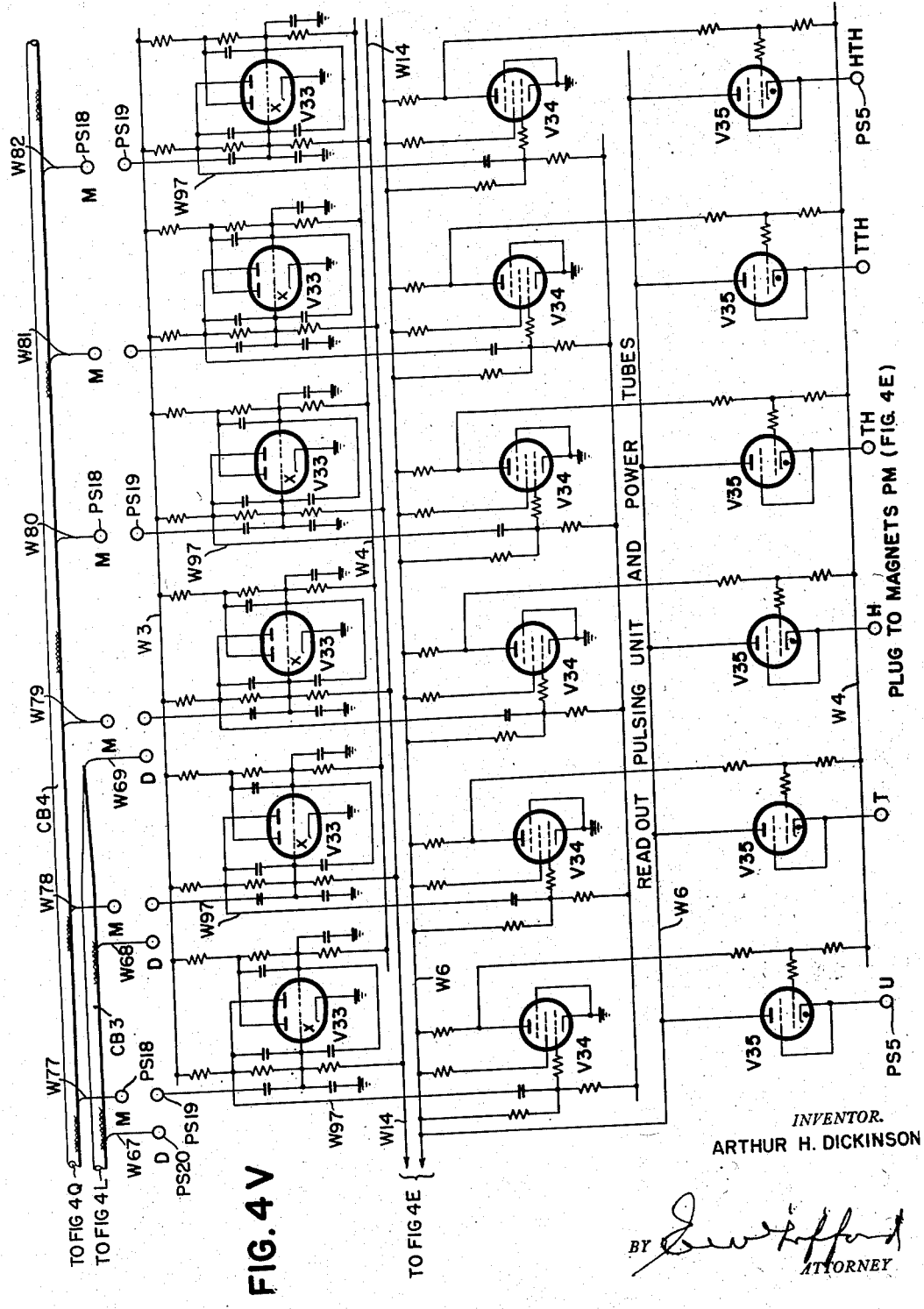

Figs. 4A to 4V, when combined, form a complete wiring diagram of both the electronic calculating unit and the record perforating machine.

Fig. 5 is a chart showing how Figs. 4A to 4V may be arranged to form the complete wiring diagram and also indicates generally the location of the principal electronic components in the individual Figures 4A to 4V.

Most commercial mechanical and electronic calculating machines operate upon the principle of repeated addition or subtraction by parallel entry in the accumulators or registers for the factors of multiplication or division and the results. This requires a very complex column shift mechanism or circuit arrangement which in electronic calculating units becomes very involved due to the very large numbers of tubes required. As a result, electronic multiplying and dividing machines are very expensive to construct and there are a large number of possible points where failure may occur due to the much larger number of tubes required.

The present invention is designed to provide a much simpler circuit with a greatly reduced number of tubes while at the same time effecting multiplication and division by the principle of repeated addition and subtraction, respectively. The principal simplification arises from the elimination of the necessity for a column shift device with the consequent elimination of the large number of tubes which are ordinarily necessary in an electronic calculating machine to carry out column shift operations.

According to the present invention a pulse source comprising a master oscillator and clipper circuit is provided and the operations of multiplication and division are carried out by connecting the principal electronic registers or accumulators directly to the pulse source. Since computing entries are not made in the various registers or accumulators by parallel entries as in conventional electronic calculating machines, it is possible to use registers in the form of relatively much simpler units counters of the binary or quinary type and effect all entries in the units orders of the different registers. In other words, multiplication and division are effected by entering in the units orders of the principal registers, and in the proper algebraic sign, successions of pulses derived from the pulse source which are maintained substantially continuously, until the complete operation of multiplication or division has been terminated.

In the present invention the only digital parallel entries are the readin entries to derive the calculation factors from the original source record and the readout of the result from the register allocated to computing the result which, of course, would be the product register in the case of multiplication and the quotient register in the case of division.

Figure 1:
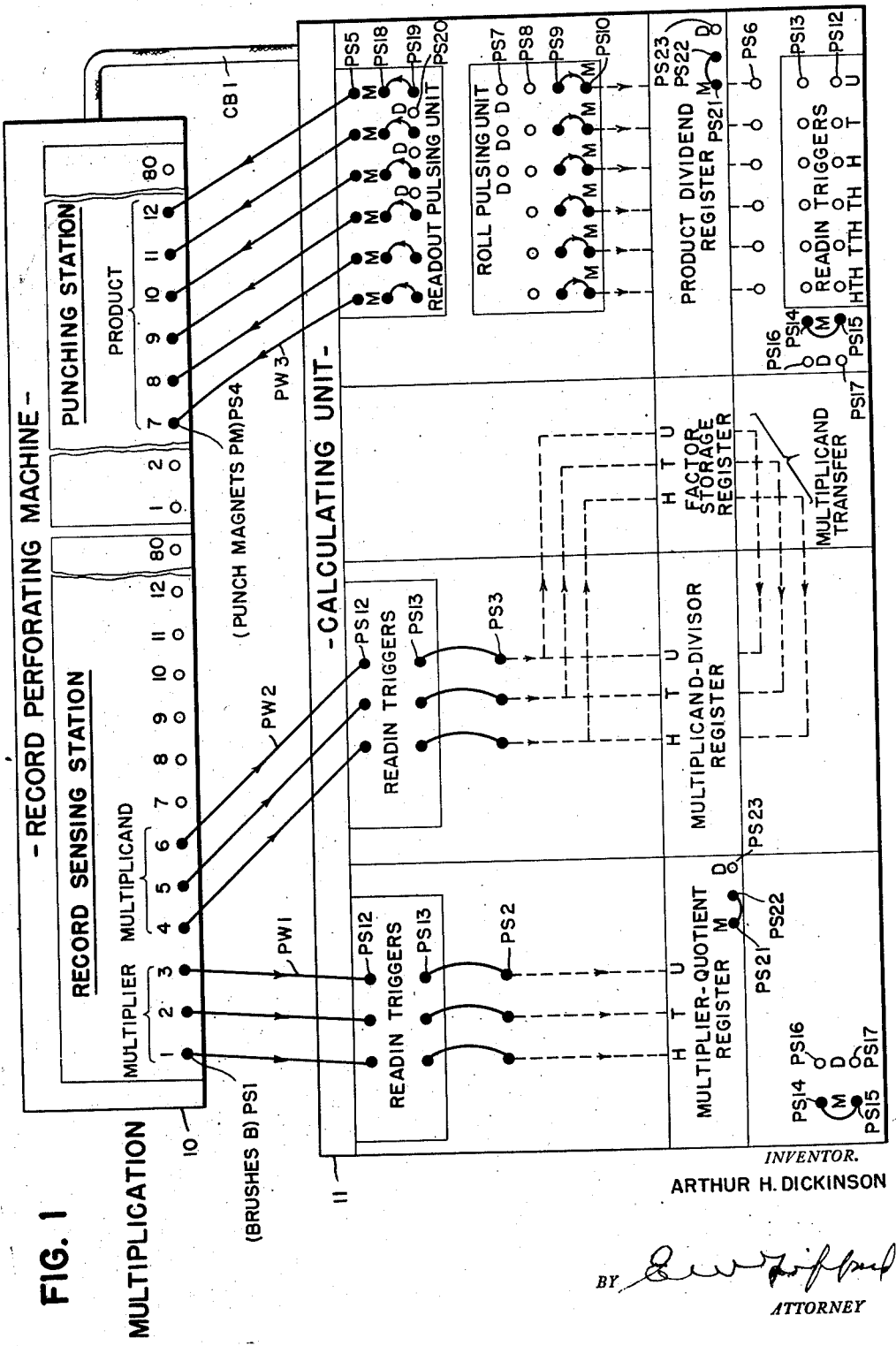
Fig. 1 is a combined apparatus block diagram, factor flow chart, and plugboard diagram for the operation of multiplication.

In Fig. 1 there is shown diagrammatically in block form the relationship of a suitable record sensing or perforating machine to the electronic calculating unit and also illustrates the general flow of impulses which are involved in factor readin, result readout, and calculating operations.

In general the calculating machine comprises two units, a record perforating machine 10 (Fig. 1) and an electronic calculating unit 11 which are interconnected by a cable CB1 which contains the main control wires coupling the record perforating unit to the electronic unit. Other cables also may be provided for making suitable electric wire connections which enable the record sensing station to be coupled to the proper electronic registers by means of plug wires PW1, PW2 and to enable the result register of the electronic unit to be coupled to the punch magnets through the plug wires PW3.

The record perforating machine, which may take one of the forms known commercially as the "IBM" gang punch or the "IBM" high speed reproducer, is disclosed in U. S. Patent No. Re. 21,133. For the purpose of reading the factors of computation from the punched cards, the gang punch or reproducer is provided with an extra set of record sensing brushes B (Fig. 4E) which are located intermediate the usual card supply hopper or magazine and the record punching station, as shown diagrammatically in U. S. Patent No. 2,624,508, to enable the entire record card to be sensed and the result calculated prior to the passage of the same card past the punches. The punches (not shown) are controlled by the usual punch magnets PM which, when energized in timed relation to the movement of the card past the punches, cause digitally valued perforations to be made in the proper index-point positions of the card in a well-known way. Since the structure of the record punching machine is not involved herein, it will not be described in detail.

Figure 3:
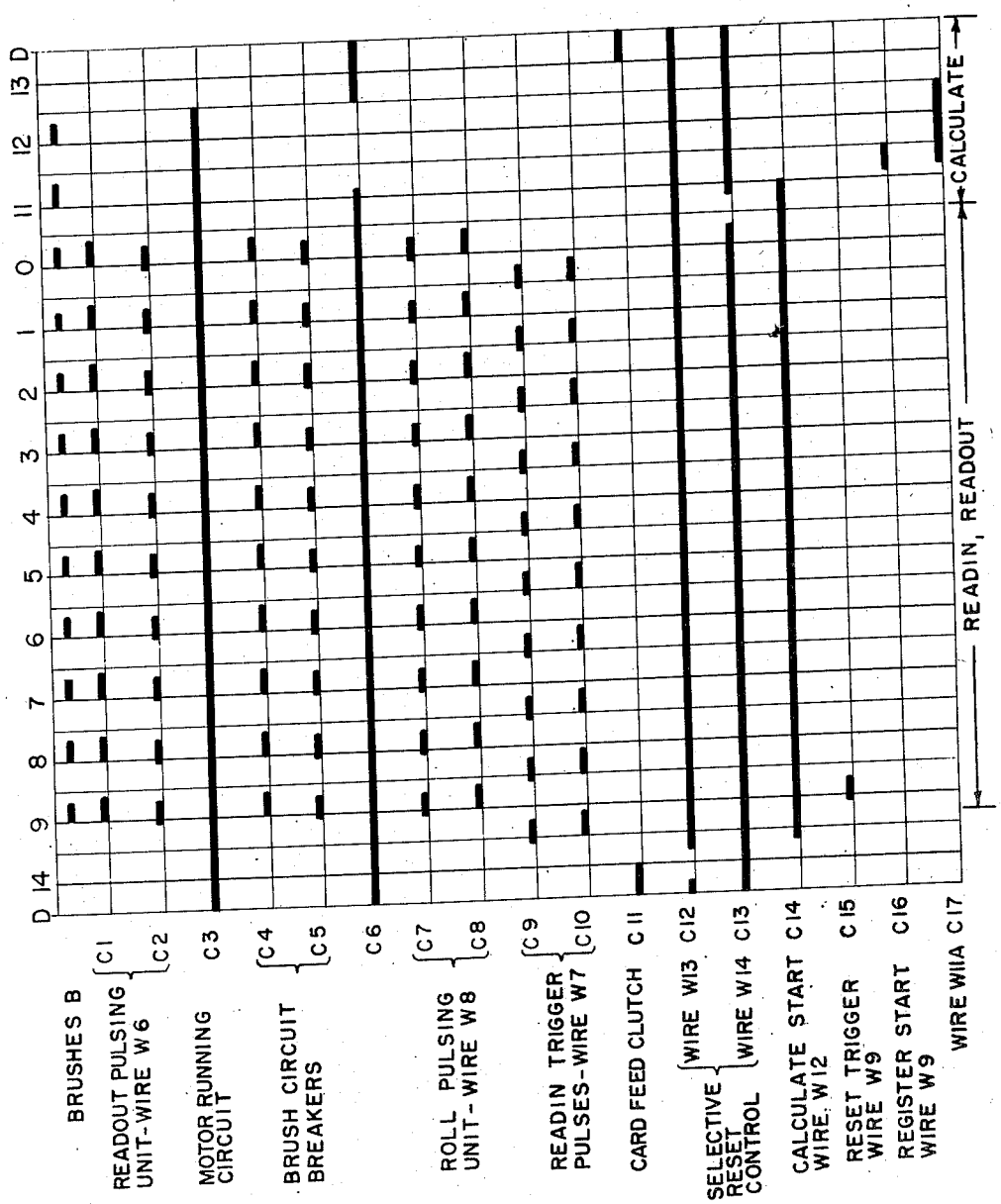
Fig. 3 is a timing chart for certain contacts operated by the record perforating machine.

It will be assumed that the record punching machine is provided with a certain number of special cam operated contacts which are actuated in timed relation to the movement of the record card past the brushes B and are designated C1 to C17 in Figs. 3 and 4E.

The electronic calculating unit basically includes four main registers for receiving the factors of multiplication and division and computing the result. These comprise the multiplier-quotient (MP–Q) register, and the multiplicand-divisor (MC–DR) register, a factor storage register, and a product-dividend (PR–DD) register (Fig. 1). At this point it should be mentioned that for simplification and brevity of description the various factors and results are indicated in the drawings by the following abbreviations:

M—Multiply
D—Divide
PR—Product
DD—Dividend
MP—Multiplier
MC—Multiplicand
DR—Divisor
Q—Quotient Also the various denominational orders of the respective registers are indicated by the letters U, T, H, TH, TTH, and HTH signifying, respectively, units, tens, hundreds, thousands, tens of thousands, and hundreds of thousands. As mentioned above, however, entries are made only in the units order during the process of calculation except that transfers are made instantaneously from the factor storage register to the multiplicand-divisor (MC–DR) register by a parallel unit impulse entry.

In order to simplify the description, the drawings illustrate a machine having a register comprising three denominational orders in each case for factor storage, for the MC–DR register, and for the MP–Q register, respectively, and comprising six orders for the PR–DD register. It will be understood, however, that the number of orders is purely arbitrary and greater capacity merely requires the simple expansion of the circuit wiring for factor storage, the MC–DR register, MP–Q register, the PR–DD register, and associated zero test controls. Three orders of these respective registers are shown in Fig. 4H to 4J for factor storage and the MC–DR register in Figs. 4M to 4O for the MP–Q registers, and in Figs. 4R to 4T for the PR–DD register. The hundreds to tens of thousands orders for the PR–DD register have been omitted for sake of simplicity but they are identical in wiring to the tens order.

The factor storage register consists of simple binary triggers which basically are of more or less conventional form, in each separate order of which the digital values 1 to 9 may be stored by a succession of from 1 to 9 pulses which are controlled by the perforations in the card in the manner made clear hereinafter. These order for factor storage are not coupled for carry purposes as it is unnecessary for these orders to pass through zero during a calculation. However, the individual orders of factor storage are cross-coupled to the respective orders of the MC–DR register to enable the multiplicand, in the case of multiplication, and the divisor, in the case of division, to be instantly transferred from factor storage to the MC–DR register during calculating operations. During the operations of multiplication and division it is essential to test certain of the registers for zero. For that purpose Figs. 4H, 4I, 4J, 4M, 4N, 4O, 4R, 4S, and 4T all show a zero test circuit which tests a single order in each case for zero.

A somewhat simplified wiring of the record perforating machine is shown in Fig. 4E which limits the wiring to the parts which are essential to the control of the electronic calculating unit or the control thereby for the purpose of recording the results. It will be understood that the record perforating machine contains all of the usual features of such a machine, here omitted for sake of brevity, and that the wiring thereof may be varied to suit a particular requirement of a field problem in a well known way.

The operation of multiplication will be described first and is carried out under control of the record card by first transferring the multiplicand and the multiplier from the record card to the electronic calculating unit. The multiplicand is transferred to both the MC–DR register and to a factor storage register which, in the present case, is assumed to have a capacity of only three digits. The multiplier is transferred to the MP–Q register.

The first stage in the calculation is to repeatedly subtract a unit from the multiplicand in the MC–DR register until that register is reduced to zero, as manifested by the associated zero test circuit. At the same time this operation takes place, a unit is added in the PR–DD register for each unit subtracted in the MC–DR register. When the MC–DR register is reduced to zero, a unit is subtracted from the MP–Q register and the multiplicand is instantly transferred from the storage register to the MC–DR register. The electronic calculating unit now repeats the first stage of operations by again subtracting a unit progressively from the MC–DR register and adding a unit in the PR–DD register until the MC–DR register again reaches zero. This process goes on continuously by successive stages until the MP–Q register has been reduced to zero signifying that the MC–DR register has been repeatedly reduced to zero as many times as the total of the digits in the multiplier, and that the PR–DD register has accumulated a total which is equal to the product of the multiplicand and multiplier.

When the MP–Q register reaches zero, the zero test controls therefor signal the termination of calculation and initiate the operation of reading out the product from the PR–DD register to the punch magnets in the perforating machine and the various registers and storage registers are automatically reset. All of the foregoing operations take place between the time the zero index-point position has been sensed in the card from which the factors of multiplication were derived and the arrival of the leading edge of the card at the punch station. Thus, the product will be perforated in the same card.

The operation of multiplication, as outlined above, may be more readily understood by means of a specific example which has been confined to a single digit each for the multiplier and multiplicand to reduce the number of stages necessary to show the complete operation and is illustrated in the following table:

TABLE I—MULTIPLICATION

|  | Product | Multiplicand |  | Multiplier |
|---|---|---|---|---|
| Factors from Card |  | 5 |  | 3 |
| Registers | PR-DD | MC-DR | Storage | MP-Q |
| Read-in to Registers |  | 5 | 5 | 3 |
| *Stage 1* |  |  |  |  |
| 5 MC-DR and PR-DD Register Entries | +1<br>+1<br>+1<br>+1<br>+1 | −1<br>−1<br>−1<br>−1<br>−1 |  |  |
| Result<br>MP-Q Register Entry | 5 | 0 |  | 3<br>−1 |
| MC-DR Transfer from Storage | 5 | 0<br>5 | ←5 | 2 |
| *Stage 2* |  |  |  |  |
| 5 MC-DR and PR-DD Register Entries | +1<br>+1<br>+1<br>+1<br>+1 | −1<br>−1<br>−1<br>−1<br>−1 |  |  |
| Result<br>MP-Q Register Entry | 10 | 0 |  | 2<br>−1 |
| MC-DR Transfer from Storage | 10 | 0<br>5 | ←5 | 1 |
| *Stage 3* |  |  |  |  |
| 5 MC-DR and PR-DD Register Entries | +1<br>+1<br>+1<br>+1<br>+1 | −1<br>−1<br>−1<br>−1<br>−1 |  |  |
| Result<br>MP-Q Register Entry | 15 | 0 |  | 1<br>−1 |
| Product Read-Out to Card | 15<br>15 | 0 |  | 0 |
| Reset | 0 | 0 |  | 0 |

It will be noted from the above that the multiplicand 5 and the multiplier 3 are transferred from the card by a readin operation to the MC–DR storage and the MP–Q register. At the end of this operation 5 stands in the MC–DR register and storage and 3 in the MP–Q register. The first stage of calculating operations consists in entering a unit additively in the units order of the PR–DD register five times and subtractively in the MC–DR register five times thereby reducing the MC–DR register to zero. Next a unit is entered subtractively in the MP–Q register and the sequence of operations is repeated for Stage 2 resulting in the accumulation of 10 in the PR–DD register, zero in the MC–DR register and the reduction of the MP–Q register to 1. A third stage now takes place similar to the first and second, causing the accumulation of 15 in the PR–DD register and the reduction of the MC–DR and MP–Q registers to zero, the latter signalling the termination of calculating operations.

The product is now read out of the product register to the punch magnets, perforated in the card, and the PR–DD register and storage register reset completing the sequence of operations to calculate the product in one card cycle of the record perforating machine. The entries in the product and multiplicand registers are effected by connecting the units order thereof to the pulse source so that the multiplication operation is carried out substantially by a continuous input of impulses to the units order of these registers. In other words, fifteen impulses derived from the master oscillator are required for computing the product of 5 and 3. If the factors had been multi-digit numbers, the same sequence of operations would take place. For example, if the multiplier is 13, the MC–DR register will have 5 taken therefrom thirteen times and 65 impulses will be entered in the PR–DD register. It is, of course, unimportant which is selected as the multiplier and multiplicand, respectively, for the operation of multiplication and in the above example the factor 3 could have been entered in the MC–DR register and the factor 5 in the MP–Q register. In such case the value 3 would be entered subtractively five times in the MC–DR register instead of the factor 5 three times. It will be seen that the foregoing process makes it possible to effect a great simplification in the circuits since the only major control required is a zero test which determines when the calculation has been completed and the calculation runs continuously until stopped by the reduction of the MP–Q counter to zero.

The specific manner in which the above sequence of operations is carried out with reference to the circuits involved and such description of component circuits as may be necessary will now be explained in detail in the order in which the operations actually take place in the machine beginning with the sensing of the card and ending with the perforation of the record in the same card.

Fig. 4E shows only so much of the wiring of the perforating machine as may be necessary to explain the operation of the electronic calculating unit and the manner in which readin and readout operations are carried out.

It is assumed that there is provided the usual driving motor for the perforating machine and that a suitable number of power supplies designated A, B, and C in Fig. 4E are provided for the electronic unit and for the various relays which control the operation of the perforating machine. Power supply A provides +150V potential for the anodes of the various electronic tubes and a −100V bias for the grids thereof. It is assumed that the various electronic chassis are maintained at a ground potential designated for power supply A as intermediate between +150V and −100V. Power supply B provides +40V for operating the various relays of the perforating machine. Power supply C provides +150V for the readout of results.

The perforating machine is started in operation by depressing the start key STK (Fig. 4E) which closes the start key contacts and enables a circuit to be established as follows: line wire W1 from power supply B, knock-off bar contacts KC and die contacts DC which are customarily provided in machines of this type, contacts A of thermal delay relay TDR, contacts R6A of power supply interlock relay R6, the contacts of stop key SPK and start key STK, and the coil of motor relay MR, to line wire W2 of power supply B which is also connected to the chassis ground in the electronic calculating unit. The motor relay MR starts the motor in the usual way and it will be assumed for present purposes that the unfinished calculation interlock relay R7 is energized holding contacts R7B closed. The contacts MRB close and, since contacts C11 are closed and when the machine is stopped, energization of the usual punch clutch magnet PCM takes place thereby starting the feeding of cards from the hopper of the perforating machine. The first card is advanced from the hopper past the brushes B which will sense the perforations representing the factors of multiplication and cause the entry of such factors in the MC–DR, storage, and MP–Q registers. Just before the brushes B sense the "9" positions of the first card (Fig. 3), contacts C12 open and disconnect the wire W13 (Fig. 4E) from the grid bias line W4. This has the effect of resetting to "Off" conducting status, as indicated by the small letter $x$ in the drawings, triggers V3, V5 (Fig. 4A); V12, V14, and V15 (Fig. 4B); the zero test triggers UZT, TZT, HZT (Figs. 4G, 4L, and 4Q); and binary register stage triggers ST1, ST2, ST4, ST8, MT1, MT2, MT4, and MT8 (Figs. 4H, 4I, and 4J). Binary register stage triggers T1, T2, T4, and T8 (Figs. 4M, 4N, 4O) for the MC–DR register or the same triggers for the PR–DD register (Figs. 4R, 4S, and 4T) also are reset according to whether the machine is conditioned to multiply or divide, either through contacts C12 and wire W13 to wire W13A (multiply) (Figs. 4M, 4N, 4O) or through contacts C13 and wire W14 to wire W13A (divide).

Compute start contacts C14 also close at this time and apply sufficient potential to the grid of tube V1 (Fig. 4A) to render it conductive. This drives the left-hand grid of compute start trigger V2 negative and causes the right-hand side of the trigger to conduct. This causes a positive pulse to be applied to the left-hand grid of trigger V3 which has no effect. Since trigger V3 was reset to "Off" status, the potential on wire W20 is held low enough to keep the injector grid of the tube V17 (Fig. 4B) at a sufficiently negative value to prevent the latter tube from conducting.

Relay R8 is energized when contacts C14 close (Fig. 4E), connecting wire W17 (see Fig. 4G, also) to the 150V line wire W3. This causes cathode follower tube V26 to conduct and raise the cathode potential thereof. As will be seen hereinafter, the consequent rise in potential of wire W15 will condition the interstage coupling tubes or gates MG2 (Figs. 4H to 4J) to permit the binary trigger stages MT1, MT2, MT4, MT8 to receive the multiplicand (or the divisor, if dividing) from the record card.

The tubes V6 to V10 (Fig. 4A) comprise a multivibrator master oscillator (tube V6) and a series of clipping and pulse shaping stages (tubes V7 to V10). The wire W106 connects the anode of clipper tube V8 to the grid of inverter tube V11 the anode of which is connected by wire W103 to the control grid of the tube V17 thereby causing the control grid to be pulsed positively with "A" pulses, but tube V17 which acts as a gate is prevented from conducting by virtue of the fact that its injector grid is sufficiently negative to keep the tube V17 cut off, as was explained above. When the injector grid of tube V17 is made positive, the "A" pulses applied to the control grid thereof cause "B" pulses to be produced at the anode which are passed to the power tube and inverter V18 and appear on wire W24 as "A" pulses. As will be seen later, these "A" pulses are controlled by a gate which supplies negative impulses continuously to the MC–DR register to progressively reduce the multiplicand or divisor to zero as many times as may be necessary to reduce the MP–Q register to zero. For the time being, however, the tube V17 is kept cut off until the factors of multiplication have been read into the storage and MC–DR registers.

When contacts C12 opened to reset triggers as noted above, trigger V12 (Fig. 4B) was reset causing it to conduct on its left-hand side. This maintains the tube V13 at cut-off thus maintaining the potential on wire W18 at a high value. The "A" pulses which would normally appear on wire W24 may be applied to the injector grid of the entry gate MG1 of the MC–DR register (Fig. 4H) but do not appear thereon at this time since the tube V17 is cut off. Furthermore, the gate MG1 is closed because its control grid is connected by wire W106 to the right-hand grid of trigger V24 (Fig. 4G) which at this time is conductive on its left-hand side thereby maintaining the wire W106 at a sufficiently low potential to keep the gate MG1 closed. Calculation cannot start until the gate MG1 (Fig. 4H) is opened to start the flow of negative pulses to the first stage trigger MT1 of the MC–DR register.

When the sensing of the data designations in the card by brushes B commences at approximately "9" in the cycle, contacts C15 close and cause trigger V2 (Fig. 4A) to conduct on its right-hand side if it is not already in that state. This will cause a positive pulse to be transmitted to the left-hand grid of trigger V3 but has no effect since this trigger is already conducting on the left-hand side.

The factors of calculation, multiplication in the present case, will now be read into the storage, MC–DR and MP–Q registers in the following manner: In Figs. 4C and 4D there is shown a series of reading triggers which are controlled by the record sensing brushes B which cause the proper entry to be made in the factor storage, MC–DR, and MP–Q registers. Prior to sensing the card, the triggers ET, which may be termed entry triggers, are made conductive on the right-hand sides thereof. This arises from the fact that the left-hand grids of the triggers ET are controlled by pulses from wire W102 which is connected to the anode of inverter tube V36. The latter in turn is controlled by trigger V37 (Fig. 4C), the grids of which are connected to wires W11, W11A (Fig. 4E). Just before "9" in the cycle, when contacts C14 close as described above, a positive pulse is applied to the right-hand grid of trigger V37 causing it to conduct on its right-hand side. This causes a positive pulse to be applied to the control grid of tube V36 and a negative pulse appears on the anode thereof which is applied by way of wire W102 and suitable coupling condensers to the left-hand grids of all of the entry triggers ET thereby causing them to conduct on the right-hand sides.

The left-hand anodes of triggers ET rise sharply in potential and this potential is applied to the injector grids of the entry gates EG. The control grids of entry gates EG are all connected to wire W7 which, it will be noted (Fig. 4E), is connected to the contacts C9, C10 which produce a series of positive pulses, one for each index-point position, on wire W7. Thus the entry gates EG conduct periodically and produce negative pulses to correspond with the positive pulses appearing on wire W7. The plug sockets PS12 are plugged to the record sensing brushes, whereas the plug sockets PS13 are plugged to the proper plug socket PS2, PS3, as indicated in Fig. 1. Since negative pulses appear continuously on the anodes of entry gates EG, these negative pulses will be emitted continuously from the plug sockets PS13 to the plug sockets PS2 with the result that at "9" in each card sensing cycle all of the orders of the storage, multiplicand-divisor, and multiplier-quotient registers will receive negative pulses.

The individual orders of the MC–DR register are provided with a common connection with a corresponding position of factor storage so that any digit entered in any order of the multiplicand-divisor register during the readin period will be entered in a factor storage position corresponding to the order. As will be noted in Fig. 4H, for example, which shows the wiring for one complete binary order of factor storage and a binary order of the MC–DR register represented by the triggers ST1, ST2, ST4, ST8 and MT1, MT2, MT4, MT8 for the units order of the MC–DR register have the input coupling condensers for the first stages ST1, MT1 connected in common to the plug socket PS3 so that any digital value entered in the units order of the MC–DR register will likewise be entered in a corresponding factor storage position.

Let it now be assumed that in the units order of the multiplicand, recorded in column 6 of the card, is the digit "9." First as explained above the entry of negative pulses to all of the orders of factor storage and the MC–DR register starts just before "9." At "9," the brush B for column 6 will sense the "9" perforation and a positive pulse will be applied to the left-hand grid of one of the entry triggers ET through the plug socket PS12 (Fig. 1), the corresponding plug socket PS13 for this same position being plugged to the plug socket PS3 for the units order of the MC–DR register. This causes the trigger ET (Fig. 4C) to shift back to conduct on the left-hand side thereby driving the injector grid of the corresponding entry gate EG negative thus cutting off the emission of negative pulses from the plug sockets PS13 to the units order of the MC–DR register. This has the effect, due to the timing of the contacts C14 and CC9, CC10, of permitting only a single negative pulse to be entered in the units order of factor storage and the MC–DR register. Had the card been punched "1," the converse would be true and nine negative pulses would have been entered in the units order. This arrangement has the effect of causing the entries in the storage and MC–DR registers to be made as the nine's complements of the true numbers punched in the card. In a similar manner the entries are made in the MP–Q register as complements.

The factor storage register is composed of binary trigger stages of which the left-hand portion is a triode and the right-hand portion a pentode. As will be seen with reference to the trigger ST1 (Fig. 4H), for example, the anode, grid, and cathode of the triode section and the screen, control grid, and cathode of the pentode are connected as a conventional Eccles-Jordan trigger circuit having a common input from the plug sockets PS3 through suitable coupling condensers. The screen grids function as anodes and are connected to the resistor networks which form part of the trigger circuits. As will be seen later, the anodes and the suppressor grids are coupled so that they function as gates to enable the stored binary values to be transferred instantaneously to the corresponding stages of the MC–DR register.

Negative pulses applied to the plug sockets PS3 during the reading of the card in the manner described above cause the triggers ST1, ST2, ST4, ST8 to function as binary triggers, the anodes and grids being coupled in a conventional way so that a negative pulse appears on the screen grid and is transmitted to the next adjacent stage on the right whereby the change of any trigger from "Off" to "On" status reverses the state of the next adjacent trigger on the right. In other words, while the storage triggers function in a generally conventional way, the usual mode of operation is reversed so as to have the effect of converting the complements entered by way of plug sockets PS3 into true numbers, that is, the trigger stages regress rather than progress.

The MC–DR register is similar to the binary form of register described in application Serial No. 386,526, filed October 16, 1953, by A. H. Dickinson and P. E. Fox except that the add control tubes AC1, AC2, AC4, and AC6 to AC9 in the aforesaid application have been omitted and the register is designed to always regress or count backwardly. In other words any pulses applied to trigger MT1 of the MC–DR register will cause the register to subtract rather than add. The tubes which are used to convert the binary to the modified binary decimal system have been retained for the operation of regression or subtraction only.

The main binary triggers which are designated MT1, MT2, MT4, MT8 are cross-coupled by subtraction inverters and gates MG2 in the same general way as the triggers T1, T2, T4, T8 are coupled by tubes SC1, SC2, SC4, SC8 in application Ser. No. 386,526 so as to always regress. Insofar as the MC–DR register is concerned, it functions as a regressing binary register but for the purpose to be made clear hereinafter the stages MT1, MT2, MT4, MT8 are not directly coupled as would ordinarily be the case as illustrated by the factor storage register but are coupled through the gates MG2. The action of these gates may be explained more clearly with reference to the triggers MT1, MT2 which are coupled by the gate MG2. When a negative entry pulse applied to the plug socket PS3 reaches the trigger MT1, it turns the latter "On" with the right side conducting. This causes a positive pulse to appear on the left-hand anode which is transmitted to the grid of the gate MG2 causing it to conduct. This produces a negative pulse on the anode of the tube MG2 which is applied to the grids of the trigger MT2 to reverse its status in a well-known way.

The suppressor grids of the gates MG2 are connected to the common line W51 which is connected to the cathodes of the tubes V25, V26 (Fig. 4G). When the cathode potential of these tubes is high, as would be the case when they are conducting, the potential on the wire W51 is high enough so that the gate MG2 can function to convert positive pulses received from the triggers MT1, MT2, etc., immediately to the left and convert them to negative impulses for controlling the triggers on the right as in application Serial No. 386,526. During the operation of multiplication, while pulses are being applied to trigger MT1 to reduce the multiplicand to zero, the tubes V25, V26 are maintained in conductive condition so that coupling exists between the stages MT1, MT2, MT4, MT8. The specific manner in which the gates comprising the right hand halves of the triggers ST1, ST2, ST4, ST8 and the gates MG2 function during the course of calculation will be made clearer hereinafter.

The specific manner in which the counter functions under control of the subtraction correcting tubes RB1, RB2, RB4 is described in detail in application Serial No. 386,526. For that reason operation of the register will not be described in greater detail as to the correcting feature.

It is necessary to test the MC–DR register for zero and for this purpose each order is provided with a group of five zero testing tubes designated ZV1, ZV2, ZV4, ZV8, ZV5 which are similar in function to tubes ZC1, ZC2, ZC4, ZC8, ZC6 in application Serial No. 386,526. Each of the first four are associated with the triggers MT1, MT2, MT4, MT8 and the right hand grids of the last named triggers are connected to a corresponding grid of one of the zero test tubes ZV1, ZV2, ZV4, ZV8. For example, if trigger MT1 is in "Off" status, the right hand grid will be held negatiive and the grid of tube ZV1 will also be held negative. The anodes of the tubes ZV1, ZV2, ZV4, ZV8 have a common connection through suitable coupling condensers to the grid of the tube ZV5. If there is any value existing in the units order, for example, at least one of the triggers MT1, MT2, etc., will be in "On" status, thereby maintaining at least one tube ZV1, ZV2, ZV4 or ZV8 in conductive condition. When any one of the tubes ZV1, ZV2, ZV4, ZV8 is conducting, the potential on wire W36 will be held so low that the grid of tube ZV5 will be maintained at cut-off.

When any MC–DR register order is restored to zero, all of the tubes ZV1, ZV2, etc., will be cut off and the potential on the grid of tube ZV5 will rise high enough to cause it to conduct thereby producing a negative pulse on the wire W33. The negative pulses produced on the wires W33 for the different orders of the MC–DR register are applied to the left hand grids of the triggers UZT, TZT, HZT (Fig. 4G) which are conventional triggers, normally conductive on the left hand side, and turn these triggers "On." For example, when the units order of the MC–DR register turns to zero, the trigger UZT will be turned "On" and, since its left hand grid is connected to the grid of the normally conductive tube ZV6, such tube will be cut off. When all of the tubes ZV6 have been cut off, the potential on wire W21 will rise sharply and, among other things, will open gate ZV18 to control the further operation of the machine in a manner to be hereinafter described.

The MP–Q and PR–DD registers are identical in wiring and are similar to the modified binary decimal reversible registers described in the application Serial No. 386,526. The units, tens and hundreds orders of the MP–Q register are shown in Figs. 4M, 4N and 4O and the units, tens, and hundred thousands order of the PR–DD register in Figs. 4R, 4S and 4T. The values accumulated in each order are represented by the states of the binary triggers T1, T2, T4, T8 which are intercoupled by the adding and subtraction control gates AG1, AG2, AG4, AG8, which function in the same way as the pairs of tubes SC1, AC1; SC2, AC2; etc., in the aforesaid application. The correcting tubes RB1, RB4, RB2 and FB1, FB4, FB2 function in the same manner as the tubes SC6, SC7, SC9 and AC6, AC7, AC9 in the aforesaid application.

The MP–Q and PR–DD registers are also provided with zero test tubes ZV1, ZV2, ZV4, ZV8, ZV5 which operate in the same manner as described above in reference to the MC–DR register. The states of the tubes ZV5 for the MP–Q register are integrated by the triggers UZT, TZT, HZT and the tubes ZV9 (Fig. 4L) which function in the same way as the tubes ZV6 to produce a positive pulse on the wire W98 whenever all of the orders of the MP–Q register go to zero which positive pulse renders the zero control tube ZV19 (Fig. 4K) conductive thereby producing a negative pulse on wire W29 which exercises a control which will be made clear hereinafter to stop calculating operations during multiplication when the multiplier has been reduced to zero.

The states of the tubes ZV5 for the PR–DD register are integrated by the triggers UZT, TZT, etc., and tubes ZV12 (Fig. 4Q) which function in the same way as described above to produce a positive pulse on the wire W75 whenever the PR–DD register goes to zero. The positive pulse on wire W75 renders the zero control tube ZV20 conductive and produces a negative pulse on wires W28, W76 which are utilized to control the termination of division in a manner which will be made clear hereinafter.

The positive pulses on wires W21, W75, W98 consist of sustained potentials which are maintained until a value is entered in one of the register orders which will have the effect of resetting the related one of triggers UZT, TZT, etc.

After the factors of computation have been entered in the storage MP–Q and DR–DD registers, the operation of multiplication will be started as a consequence of the opening of the contacts C14. It will be recalled that the compute-start tube V1 was initially made conductive, and as long as this tube is conductive, the compute-start trigger V2 will be maintained in "On" status with the right side conductive. When calculate start contacts C14 open just after "11" in the cycle (Fig. 3), the tube V1 (Fig. 4A) will be cut off and a positive pulse will be produced thereby forcing the trigger V2 to "Off" status. This produces a negative pulse which causes the trigger V3 to be turned "On" with the right side conducting. As a result, the potential of the left hand anode of trigger V3 rises sharply and conditions the gate V17 (Fig. 4B) to conduct. Since the control grid of the tube V17 continuously receives "A" pulses from the wire W103, "B" pulses will appear on the anode and will control the inverter and amplifier V18 to produce "A" pulses which are transmitted by way of wire W24 to the injector grid of the gate MG1.

The gate MG1 (Fig. 4H) is connected by wire W109 to the right hand grid of trigger V24 (Fig. 4G) which is in "Off" status with the left hand side conducting during the period in which the card is sensed preventing entries in the MC–DR register. The trigger V24 is placed in "On" status with the right side conducting by a negative pulse received over wire W18 from the anode of the inverter V13. This tube is caused to conduct when a trigger V12, which is in "Off" status during the sensing of the card with the potential of the left anode holding the injector grid of tube V13 at cut-off potential, is turned "On."

At the end of the card sensing period, contacts C16 close (Figs. 3 and 4E) and connect wire W9 to the power supply B. This causes a positive pulse to be applied to the left side of trigger V5 (Fig. 4A) which will assume "On" status and will produce a negative pulse on wire W104 which will turn the trigger V12 "On" with the right hand side conducting. This will cause a positive pulse to be produced on the left hand anode of tube V12 which will be passed to the inverter V13. Thus, a negative pulse will be produced on wire W18 which turns trigger V24 on and opens the gate MG1 and starts Stage I of the calculation (Table I).

As a result, a continuous series of "B" pulses will be applied to the trigger MT1 in the units order of the MC–DR register. Since this register always regresses, each single pulse will subtract a unit from the multiplicand stored as a true number in the register. Ultimately, the MC–DR register will reach zero and the zero test tubes ZV1, ZV2, ZV4, ZV8, ZV5 will function as described above to indicate this fact, and negative pulses will be produced on the wires W33 for each of the orders of the MC–DR register. These pulses, through the triggers UZT, TZT, HZT and tubes ZV6 will cause the potential on the wire W21 to rise.

This positive potential which is applied to the grid of inverter V22 (Fig. 4F) causes a negative pulse to appear on the wire W32. The positive potential which is on wire W21 also is applied to the injector grid of tube ZV18, thus priming it for conduction. Tube V4 (Fig. 4A) also is rendered momentarily conductive.

The negative pulse on wire W32 is applied to the grid of tube V25 (Fig. 4G), thereby cutting it off and causing its cathode potential to drop. The consequent drop of potential in wire W51 causes the gates MG2 for the MC–DR register to be closed, preventing inter-stage coupling of the MC–DR register.

A negative pulse is produced on the anode of tube V4 and wire W105 (Fig. 4A) which places the trigger V12 (Fig. 4B) in "Off" status. Tube V13 cuts off. The negative pulse on wire W30 turns trigger V24 "Off" thereby closing gate MG1 to momentarily suppress pulses to the MC–DR register.

The negative pulse on wire W30 also is applied through diode D (Fig. 4M) to trigger T1 of the MP–Q register to add one unit in the units order.

At the time the MC–DR register goes to zero, at the end of Stage I, the MP–Q register contains the multiplier and the PR–DD register has accumulated the multiplicand (Table I) by means to be made clear hereinafter. The potentials on wires W75, W98 are both low cutting off tubes ZV19, ZV20 (Fig. 4K). Wires W28, W29 thereby are held at high potential conditioning both gates G2, G3 for conduction. Gate G2, through inverter V20 conditions gate G1 for conduction. Since wire W21 is now at high potential (the MC–DR register being at zero) gate ZV18 conducts on a "B" pulse and, through inverter V19, causes G1 to produce an "A" pulse on wires W23, W99.

The negative pulse on wire W23 turns trigger V12 (Fig. 4B) back "On" and has the effect, discussed above, of turning trigger V24 back "On" to restart feeding pulses to the MC–DR register through gate MG1.

The negative pulse on wire W99 is inverted by tube V23 (Fig. 4G) and applied as a positive pulse over wire W27 to the suppressor grids of all of the pentode sections of binary stages ST1, ST2, ST4, ST8 (Figs. 4H, 4I, 4J). This causes anode current to flow in the pentode sections of any stage ST1, ST2, ST4, ST8 which is in "On" status and produces a sudden drop in anode potential which is transmitted, through the wires W40, W41, W42, W43, and suitable coupling condensers, to the left hand grids of the triggers MT1, MT2, MT4, MT8 thereby forcing the latter triggers to assume the status of the corresponding factor storage register triggers. This has the effect of transferring any values in factor storage, which in the present case is the multiplicand, back to the MC–DR register in preparation for the Stage II sequence of pulses representing the multiplicand. The gates MG2, it will be recalled, were disabled under control of the tube V25 thereby preventing the change of any trigger MT1, MT2, MT4, MT8 from "Off" to "On" status from affecting the adjacent trigger on the right.

As soon as a value is entered in the MC–DR register, at least one of the all-zero control tubes ZV1, ZV2, ZV4, ZV8 function, producing negative pulses on wires W36 which are applied to the right hand grids of the triggers UZT, TZT, HZT (Fig. 4G), turning said triggers to "Off" status.

When the tube V22 is rendered conductive, as described above, a negative pulse is produced on wire W30 which is applied to the trigger T1 (Fig. 4M) thereby adding a unit in the units order of the MP–Q register. Since, for multiplication, this register is conditioned for subtraction, the value is actually deducted from the multiplier. Since the MC–DR register now again stands at the value of the multiplicand, the all-zero control will function to reset one or more of the triggers UZT, TZT, HZT, which will have the effect of dropping the potential on the wire W21 thereby cutting off the tube V22 and preventing more than one entry in the MP–Q register.

The operations just described take place almost simultaneously between the positive going portions of two successive "A" pulses, or the corresponding negative going portions of "B" pulses, which are normally 180° electrically out of phase with the "A" pulses, and they may be understood by briefly reviewing the action when the MC–DR register goes to zero and tube V22 conducts.

The negative impulse from wire W30 is applied to the right hand grid of trigger V24 flopping it "off." This causes the potential on wire W98 to fall sharply and close gate MG1 thereby preventing any more "A" pulses from controlling this gate. A negative pulse was produced on wire W23 when the gate G1 was initially made conductive to cause the multiplicand to be transferred and this negative pulse applied to the left hand grid of trigger V12 flips the trigger to "On" status. A positive pulse transmitted to the tube V13 causes it to conduct and produce a negative pulse on wire W18 which is effective to flip trigger V24 to "On" status. This, through the rise in left hand anode potential, causes the gate MG1 to open and permits "A" pulses to affect the gate and produce negative pulses which are applied to the trigger MT1.

The gate MG1 is primed on the negative going portion of the particular "A" pulse which was effective to turn the MC–DR register to zero and the gate MG1 is opened before the positive going portion of the next "B" pulse. The transfer of the multiplicand from the factor storage register to the MC–DR register takes place on the negative going portion of the same "B" pulse so that substantially all of the events described for the portion of the operation where a unit is added in the MP–Q register and subtracted in the MC–DR register takes place within the time allocated to the positive going portion of an "A"

pulse and the immediately following positive going portion.

For the purpose of controlling the MP-Q and PR-DD registers in the proper sense during multiplication and division there is provided the "Add" trigger AT1 for the MP-Q register and the "Add" trigger AT2 for the PR-DD register. These triggers are like the add-subtract triggers AST in application Serial No. 386,526.

When multiplication is desired, the plug sockets PS14, PS15 (Fig. 4K) are connected by a double plug (see Fig. 1 also) thereby making the right hand side of trigger AT1 conductive. This results in rendering the tube CF2 conductive, due to the wire connection W74, and the tube CF1 non-conductive due to the wire connection W73. The trigger AT1 and the tubes CF1, CF2 function in the same general manner as described in the above application to control two bias lines W64, W65 to render the right hand halves of the "Add" gates AG1, AG2, AG4, AG8 effective to pass pulses between the binary trigger stages for operation of the register in a reserve direction and the left hand halves operative for functioning of the register in a forward direction. Similarly, the "Add" trigger AT2 (Fig. 4P) through wires W73, W74 controls triggers CF1, CF2 and similar bias wires W64, W65 for the PR-DD register. When the machine is plugged to operate for multiplication, the left hand side of trigger AT2 is made conductive which results in cutting off tube CF2 and rendering tube CF1 conductive.

In application Serial No. 386,526 the tubes SC1, SC2, SC4, SC8 perform the same functions as the right hand triodes of the tubes AG1, AG2, AG4, AG8, while the tubes AC1, AC2, AC4, AC8 correspond in function to the left hand triodes of the tubes AG1, AG2, etc. While the sense of the outputs of the triggers T1, T2, T4, T8 to the tubes AG1, AG2, etc., is reversed in the present case, the sense of the primary wires W64, W65 likewise is reversed over application Serial No. 386,526 so that the register orders function in the same way in both cases.

Means are provided to pulse the PR-DD register in parallel with the pulsing of the MC-DR register to accumulate the product. This pulsing of the PR-DD register is accomplished by the following means. Closure of contacts C16 at the beginning of calculating operations causes a positive pulse to be applied over wire W9 to the left hand grid of trigger V14 (Fig. 4B), turning it "On." This causes a negative pulse from the left hand anode of trigger V14 to be applied to the left hand grid of trigger V15, thereby turning it "On." As a result, a sharp rise in potential of the left hand anode of tube V15 is applied to the injector grid of inverter tube V16 which conducts and produces a negative pulse transmitted over wire W22 to the trigger V29 (Fig. 4P thereby turning trigger V29 "On" to conduct on the right hand side. The left hand anode potential of tube V29 rises and raises the grid potential of gate G5 sufficiently to condition it for conduction.

The injector grid of gate G5 is connected by wire W53 to the tube V27 (Fig. 4K) which normally is conductive. The control grid of tube V27 is connected to the anode of gate G4 which normally is non-conductive. The injector grid of gate G4 is connected to wire W24 on which, it will be recalled, "A" pulses continually appear during the process of any calculation. The control grid of gate G4 is connected by wire W32 to the anode of tube V22 (Fig. 4F). The tube V22 is controlled by wire W21 and the MC-DR zero control. Thus tube V22 will be normally cut off and wire W32 remains at high potential, maintaining the gate G4 conductive during calculating. It follows the "B" pulses appear on the anode of gate G4 which are inverted by tube V27 and applied via wire W53 to gate G5 and produce "B" pulses on wire W100 and pulse trigger T1 of the PR-DD register. The tube V22 is made conductive only momentarily when the MC-DR register goes to zero.

It is clear that the PR-DD register will be continuously pulsed during a multiplying operation which pulsing will start simultaneously with pulsing of the MC-DR register since triggers V5, V12, V14, V15 all derive their starting pulses from wire W9 and contacts C16 and such pulsing will be interrupted by tube V12 whenever the MC-DR register goes to zero.

The multiplicand register is now again reduced to zero, the multiplicand again added in the PR-DD counter, and a unit subtracted in the MP-Q counter for Stages 2 and 3 until the MP-Q counter has been turned to zero. As a result of these operations a product will be accumulated in the PR-DD register according to the principle first explained above and outlined in Table I.

The all-zero control of the MP-Q register causes a sharp rise in potential on the wire W98 in the same manner as described above for the wire W21 of the MC-DR zero control which will signal zero in the MC-DR register just before wire W98 signals zero in the MP-Q register. Since the product has been accumulated in the PR-DD register, the potential on wire W75 will remain low and tube ZV20 remains cut off. The gates G2, G3 (Fig. 4F) will now to cut off or closed because the tube ZV19 will be caused to conduct by the sudden rise in potential on wire W98 caused by the MP-Q register going to zero thereby producing a negative potential on wire W29. Thus, though wire W28 remains high, the gate G2 is now cut off and the anode potential thereof rises and causes tube V20 to conduct. This produces a reduction in the potential of the injector grid for gate G1 and prevents the "B" pulses derived from the inverter tube V19 from having any effect on gate G1. Thus it is not possible to effect a multiplicand transfer operation at this time since the tube V23 will remain in conductive condition holding the potential of wire W27 down. However, triggers V12 and V24 will be turned "Off" to cut-off, closing the gate MG1 and preventing further negative pulses to the MC-DR register. This results from the MC-DR register going to zero for the last time whereby the all-zero control thereof function to cause the same sequence of operations at the end of Stage 3 as was described above for Stage 1, the tube V22 being made conductive, gate ZV18 opened for one cycle as above, and a final negative pulse emitted over wire W30 to the trigger T1 of the MP-Q register turning it to zero and signifying that multiplication has been completed.

Gate G3 is also cut off causing a rise in potential on wire W31 and causes tube V21 (Fig. 4F) to conduct producing a negative pulse over wire W19 which is applied to the right hand grid of the compute-start trigger V3 (Fig. 4A) thus flopping it "Off." Thus causes a sharp drop in potential on wire W20 which closes the gate V17 and prevents further production of "A" pulses on wire W24.

Relay R9 (Fig. 4E) is energized when cam contacts C6 close between "12" and "13" in the cycle (Fig. 3) thereby energizing relay R9 and causing the R9A contacts to close. This connects wire W16 and the anode of gas tube V28 (Fig. 4L) to the +150 volt wire W3. Since the MP-Q register is already at zero, wire W31 connected to the grid of gas tube V28 is at high potential. Thus, gas tube V28 fires when the contacts R9A close and energizes relay R7 over a circuit as follows:

Wire W3, contacts R9A, wire W16, through gas tube V28 (Fig. 4L), wire W10, and relay R7, to ground wire W2 (Fig. 4E).

With relay R7 now energized, the R7A contacts close to effectively bridge the opening of cam contacts C3 in the motor relay MR running circuit. Thus the motor will continue to run. The contacts R7B close to condition the punch clutch magnet PCM circuit for energization when cam contacts C11 close a moment later. Thus the punch clutch will be impulsed for another cycle of operation.

On the other hand, if the calculation had been unfinished, this condition would have been indicated by the non-zero status of the MP-Q register. Consequently, wire W31 will remain at low potential, as is now understood, and gas tube V28 will not be fired. It follows, therefore, that relay R7 will not be energized; the punch clutch will remain latched, and the machine will stop. Relay R7 will become energized, however, as soon as the calculation is completed and normal operation will be resumed to allow the feeding of the next succeeding card from the magazine.

It was assumed hereinbefore that relay R7 was energized so that cards could be fed from the magazine to start the machine. It should now be clear that relay R7 will be energized near the end of each machine cycle whenever the MP-Q or PR-DD register is at zero. Initially this condition is satisfied when the above mentioned registers are reset to zero status by the action of the continuously running reset cams C12 and C13.

The next step is to record the product during the next succeeding card cycle, when the card bearing the factors of multiplication passes the punches. For the purpose of recording the product provision is made to pulse the product dividend register separately in each order and includes the triggers V30, V31, and the inverter tube V32 (Fig. 4U). It also includes the readout triggers V33, inverters V34, and the power tubes V35 (Fig. 4V).

It will be noted in Figs. 4R, 4S and 4T that each of the all-zero controls for the PR-DD register has a connection through the wires W77 and W78 to W82 through the cable CB4 to the plug sockets PS18 (Fig. 4V). The inputs to the readout triggers V33 are provided with plug sockets PS19 which, as shown in Fig. 1, are plugged to the plug sockets PS18 order by order to permit the reading out of the product. In Fig. 1, it will be noted that the plug sockets PS9, PS10 (see Fig. 4U, also) are interconnected for a product readout operation which has the effect of connecting the anodes on the tubes V30 to individual wires W91 to W96 of cable CB6 which it will be noted in Figs. 4R to 4T lead to the plug sockets PS6 each of which is connected to the input condensers of the first stage triggers T1 for the PR-DD register.

The wires W7, W8 leading from the timing contacts C9, C10 and C7, C8 are connected to the left and right hand grids of the trigger V31 (Fig. 4U) respectively. It will be seen from Fig. 3 that the combined effect of the contacts C9, C10 is to initially close a circuit over wire W7 to the left hand side of trigger V31 causing it to conduct. Immediately thereafter, at about the "9" index-point position, while the "9" index-point positions in the card are at the punches, contacts C7, C8 combine to close a circuit via wire W8 to the right side of the trigger V31. Thus the effect of the contacts C7 to C10 is to cause a periodic flip-flop of the trigger V31.

Each time the trigger V31 (Fig. 4U) is conductive on the left hand side, which will be first in the sequence, a sharp rise in potential will be produced on the right hand anode of trigger V31 which is effective to render tube V32 momentarily conductive. This produces a negative pulse which is applied by way of wire W101 to the control grids of all of the inverter tubes V30, producing a positive pulse on the anodes thereof which will be communicated through the plug sockets PS9, PS10 and wires W91 to W96 and cable CB6 to the triggers T1 of the PR-DD register which, however, will have no effect as these triggers are not responsive to positive pulses. Immediately thereafter at "9" in the cycle, the trigger V31 will flip producing a negative pulse on the right hand anode of trigger V31 which will cut off tube V32 and produce a positive pulse effective on the grids of tubes V30 to cause them to conduct. This produces negative pulses on the anodes of tubes V30 which are passed through the plug sockets PS9, PS10, wires W91 to W96, and cable CB6 to the triggers T1 (Figs. 4R, 4S, 4T). Ten sets of rolling pulses are produced by tubes V30 which advance the orders of the PR-DD register to zero and back to the original values registered.

In order to understand the rolling action of the negative pulses just mentioned, let it be assumed that the units order (Fig. 4R) of the PR-DD register stands at "9." This register is conditioned for forward or adding operation with the result that the initial rolling pulse causes the units order to turn to zero. In turning to zero all of the tubes ZV1, ZV2, ZV4, ZV8 for the units order will be cut off causing units order tube ZV5 to conduct, producing a negative pulse on wire W77. This negative pulse is applied to the left hand grid of the trigger V33 (Fig. 4V) at the extreme left. These triggers are reset to conduct on the left hand sides near the end of each cycle just before computing operations start, so that the negative pulse just mentioned causes the trigger V33 to turn "On," right side conducting. This produces a negative pulse on wire W97 which is passed to the grid of the tube V34 thus momentarily cutting off this tube and causing its anode potential to rise suddenly. This in turn causes the gas tube V35 to conduct.

It will be noted in Fig. 1 that the plug sockets PS5 are plugged to the plug sockets PS4 for the punch magnets which would involve column 12 for the units order. This causes the punch magnet to be energized and punch a "9" in the card.

When the gas tube V35 conducts, current flow is established to energize a punch magnet PM as follows:

Power supply C (Fig. 4E), cam contacts C1 and C2 now closed (see also Fig. 3), card lever relay contacts R3B now closed, wire W6 to the anode of gas tube V35 (Fig. 4V), plug socket PS5, plug wire PW3 (Fig. 1), plug socket PS4 and a punch magnet PM to ground wire W2.

Any gas tube C35 fired will be extinguished approximately one-half cycle point later when cam contacts C1 and C2 open to remove the anode supply potential.

In the foregoing description no account has been taken of the normal electromechanical lag which always occurs in machines of this type and which requires some individual adjustment of each machine. Thus, while it is stated that the flopping of trigger V31 takes place while the "9" index-point positions are under the punches, it will be understood that it may be necessary to adjust the timing of the contacts C7, C8 to insure that the pulse to the punch magnet PM will occur while the card is being held stationary by the intermittent feed mechanism in a well-known way.

In a similar manner, varying numbers of roll pulses cause the different orders of the PR-DD register to go to zero and punch the digital values which are part of the product.

During this same card feeding cycle the factors of multiplication for the next card also will be automatically transferred to the factor storage, MC-DR and MP-Q registers and the calculating-start contacts C14 will again function as described above to prepare the machine for a new calculating operation.

Figure 2:
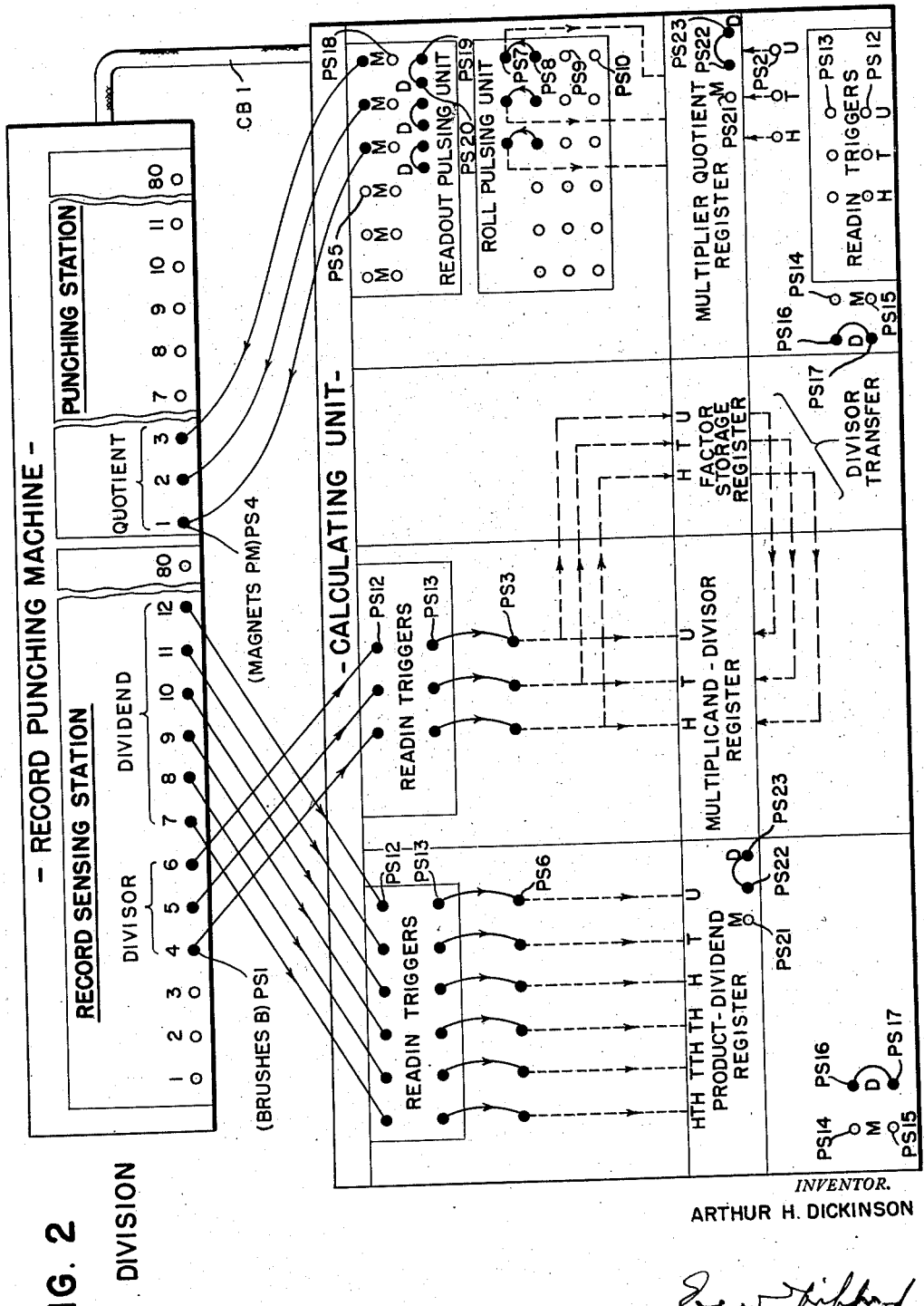
Fig. 2 is a similar diagram for the operation of division.

In Fig. 2 there is shown the plugging of the machine and the flow of the various factors and results in the form of a combined block diagram, flow chart and plugging diagram to illustrate the operation of division. This operation is accomplished in substantially the same way as multiplication except that the status of the MP-Q and PR-DD registers is reversed, the PR-DD register receiving the dividend from columns 7 to 12 of the card and the divisor from columns 4 to 6. While it is not necessary, the arrangement of the factors as derived from the card is the same as for the preceeding example, that is, what was the product above is now the dividend derived from the same columns of the card and the multiplicand now becomes the divisor. What was originally the multiplier and known, now becomes the unknown quotient. This method of disclosure has been adopted primarily for the purpose of illustrating the similarity between the two operations of the machine and it will be understood that in practice the multiplier, multiplicand, product, divisor, dividend, and quotient may be recorded in any place on the card.

For this operation the multiplier-quotient counter is conditioned for adding and the product-dividend counter for subtraction by connecting plug sockets PS16, PS17 as shown in Fig. 2. With reference to Figs. 4K and 4P, it will be observed that this will result in the reversal of the status of the "Add" triggers AT1, AT2 and of the tubes CF1, CF2 so that the add-subtract bias lines W65 for the MP–Q register and W64 for the PR–DD register are high and the bias line W64 for the MP–Q and W65 for the PR–DD register are low. Thus the right hand sides of the "Add" gates AG1, AG2, AG4, AG8 for the PR–DD register are primed for conduction and the left hand halves of the same gates for the MP–Q register are primed for conduction.

Except for the fact that the MC–DR and factor storage registers now receive the divisor instead of the multiplicand, operation of the machine is the same as before. When the MC–DR register goes to zero, the tube V22 is rendered momentarily conductive and produces a negative pulse on wire W30 which is applied to the MP–Q register in the units order, but will be added instead of subtracted as the first step in building the quotient. For each unit entered into the MC–DR register, a similar unit will be entered in the PR–DD register by the same circuits as described above but will be subtracted from the dividend which now exists in this register. Thus the PR–DD register will be progressively reduced to zero.

The sequence of operations for division is shown in the following table:

TABLE II—DIVISION

|  | Dividend | Divisor | | Quotient |
|---|---|---|---|---|
| Factors from Card | 15 | 5 | | |
| Registers | PR–DD | MC–DR | Storage | MP–Q |
| Read-In to Registers | 15 | 5 | 5 | |
| *Stage 1* | | | | |
| 5 MC–DR and PR–DD Register Entries | −1<br>−1<br>−1<br>−1<br>−1 | −1<br>−1<br>−1<br>−1<br>−1 | | |
| Result | 10 | 0 | | 0 |
| MP–Q Register Entry | | | | +1 |
|  | 10 | 0 | | 1 |
| MC–DR Transfer from Storage | | 5 | ←5 | |
| *Stage 2* | | | | |
| 5 MC–DR and PR–DD Register Entries | −1<br>−1<br>−1<br>−1<br>−1 | −1<br>−1<br>−1<br>−1<br>−1 | | |
| Result | 5 | 0 | | +1 |
| MP–Q Register Entry | | | | +1 |
|  | 5 | 0 | | 2 |
| MC–DR Transfer from Storage | | 5 | ←5 | |
| *Stage 3* | | | | |
| 5 MC–DR and PR–DD Register Entries | −1<br>−1<br>−1<br>−1<br>−1 | −1<br>−1<br>−1<br>−1<br>−1 | | |
| Result | 0 | 0 | | 2 |
| MP–Q Register Entry | | | | +1 |
|  | 0 | 0 | | 3 |
| Quotient Read-Out to Card | | | | 3 |
| Reset | 0 | 0 | 0 | 0 |

The principal difference in operation between multiplication and division lies in the effects produced when the operation has been terminated by reducing the dividend to zero. In this case the PR–DD and MC–DR registers will go to zero substantially simultaneously causing both the gates G2, G3 to be simultaneously closed. The closing of gate G2 also closes gate G1 which prevents the transfer of the divisor from the factor storage register to the MC–DR register and also prevents turning trigger V12 back "On." This prevents turning the trigger V24 back "On" and keeps the gate MG1 closed to prevent further entries in the MC–DR register. The tube V22 is rendered conductive as the result of the MC–DR register going to zero and causes a unit to be added in the MP–Q counter. The positive pulse over wire W21 is effective in Fig. 4A through the inverter tube V4 to produce a negative pulse on wire W105 which flops trigger V12 (Fig. 4B) "Off." A negative potential appearing on wire W32 causes the gate G4 (Fig. 4K) to be cut off thereby producing a rise in the anode potential thereof which is applied to the grid of tube V27 rendering it continuously conductive. This produces a drop in potential on wire W53 which closes the gate G5 to prevent further impulsing of the PR–DD register.

The PR–DD register in going to zero produces a positive rise in potential on wire W75 which causes the tube ZV20 (Fig. 4K) to conduct. This produces a negative pulse which is applied over wire W76 to the gate G5 which also is effective to keep gate G5 closed. This same pulse on wire W76 is applied to the right hand grid of trigger V29 to turn this trigger "Off." The closing of gate G5, which now will be held closed by the trigger V29, prevents further pulses to the trigger T1 of the PR–DD register over wire W100.

When the gate G3 is closed as a consequence of the PR–DD register going to zero, tube V21 (Fig. 4F) is rendered conductive and produces a negative pulse which is applied over wire W19 to the right hand grid (Fig. 4A) of trigger V3 turning it "Off." This closes the gate V17 due to the drop in potential of the left hand anode of trigger V3 and prevents further "A" pulses from reaching any of the computing circuits, including the gate G4.

Thus, at the end of the sequence of operations in Table II, the MP–Q register will have accumulated the quotient which will be punched in the manner described above through connections which are similar to those used for the punching of the product. It will be noted in Fig. 4U that the result roll pulsing unit is provided with the plug sockets PS3 which may be connected by double plugs to the plug sockets PS7. The wire connections W106 to W108 in cable CB5 lead to the plug sockets PS2 for the MP–Q order. Thus the roll pulses which were applied to the individual orders of the PR–DD register in multiplying are now applied to the triggers T1 for the MP–Q register. It will also be noted in Fig. 4V that the left hand three triggers V33 may be plugged to the plug sockets PS20 and wire connections W67, W68, W69 to the anodes of the tubes ZV5 of the all-zero controls for the MP–Q register so that, when appropriate orders of the MP–Q register are reduced to zero, the triggers V33 will be operated to render gas tubes V35 effective to record the quotient in columns 1, 2, and 3.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an electronic multiplying and dividing machine, a pulse source, an electronic product-dividend register, an electronic multiplier-quotient register, selective means to condition the first register for addition and the second for subtraction for a multiplying operation and to condition the first register for subtraction and the second for addition for a dividing operation, a normally subtracting electronic multiplicand-divisor register, separate electronic zero detection circuits for each of said registers, an electronic multiplicand-divisor storage register, circuits rendered operative by the zero detection circuit of the multiplicand-divisor register for transferring the factors stored in the storage register to the multiplicand-divisor register, a gating circuit connecting the pulse source to the multiplicand-divisor register and rendered effective by the zero detection circuits for either of the first two registers to cut off pulses to the multiplicand-divisor register when either of the first two registers reach zero, a circuit rendered effective by the zero detection circuits for the multiplicand-divisor register for pulsing the multiplier-quotient register once each time the multiplicand-divisor register reaches zero, a second gating circuit for connecting said product-dividend register to said pulse source for pulsing in parallel with the multiplicand-divisor register, starting circuits for the gating circuits, and circuit means jointly rendered operative by either of the zero detection circuits for the first two registers for disabling the starting circuits.

2. In an electronic dividing machine, a pulse source, an electronic dividend register, an electronic quotient register, means to condition the first register for subtraction and the second for addition for a dividing operation, a normally subtracting electronic divisor register, separate electronic zero detection circuits for each of said registers, an electronic divisor storage register, circuits rendered operative by the zero detection circuit of the divisor register for transferring the factor stored in the storage register to the divisor register, a gating circuit connecting the pulse source to the divisor register and rendered effective by the zero detection circuits for the dividend register to cut off pulses to the divisor and dividend registers when the dividend register reaches zero, a circuit rendered effective by the zero detection circuits for the divisor register for pulsing the quotient register once each time the divisor register reaches zero, a second gating circuit for connecting said dividend register to said pulse source for pulsing the dividend register in parallel with the divisor register, means made effective by the zero detection circuits of the divisor register for rendering the divisor transfer circuits effective, starting circuits for the gating circuits, and circuit means rendered operative by the zero detection circuits for the dividend register for disabling the starting circuits.

3. In an electronic multiplying machine, a pulse source, an electronic product register, an electronic multiplier register, means to condition the first register for addition and the second for subtraction for a multiplying operation, a normally subtracting electronic multiplicand register, separate electronic zero detection circuits for each of said registers, an electronic multiplicand storage register, circuits rendered operative by the zero detection circuit of the multiplicand register for transferring the factors stored in the storage register to the multiplicand register, a gating circuit connecting the pulse source to the multiplicand register and rendered effective by the zero detection circuits for the multiplier register to cut off pulses to the multiplicand register when the multiplier register reaches zero, a circuit rendered effective by the zero detection circuits for the multiplicand register for pulsing the multiplier register once each time the multiplicand register reaches zero, a second gating circuit for connecting said product register to said pulse source for pulsing in parallel with the multiplicand register, means made effective by the zero detection circuits of the multiplicand register for rendering the multiplicand transfer circuits effective, starting circuits for the gating circuits, and circuit means rendered operative by the zero detection circuits for the multiplier register for disabling the starting circuits.

4. In an electronic calculating machine, a pulse source, an electronic dividend register, and an electronic divisor register both arranged for reverse registration when pulsed by said source to reduce a divisor and a dividend to zero, zero test means for said divisor register, means controlled by said zero test means for repeatedly restoring the divisor to said divisor register each time the latter reaches zero, an electronic quotient register, a circuit for pulsing said quotient register a unit for each reduction of the divisor to zero, means to determine when the dividend register has been pulsed a number of times equal to the dividend, and circuits for connecting the divisor register and dividend register to said pulse source, including switching means controlled by the determining means for disconnecting the registers from the pulse source when the dividend register has been pulsed to correspond with the dividend.

5. In an electronic calculating machine, a pulse source, an electronic product register, an electronic multiplicand register arranged for reverse registration when pulsed by said source to reduce a multiplicand to zero, zero test means for said multiplicand register, means controlled by said zero test means for repeatedly restoring the multiplicand to said multiplicand register each time the latter reaches zero, an electronic multiplier register, a circuit for pulsing said multiplier register a unit for each reduction of the multiplicand to zero, means to determine when the multiplier register has been pulsed a number of times equal to the multiplier, and circuits for connecting the multiplicand register and product register to said pulse source, including switching means controlled by the determining means for disconnecting the registers from the pulse source when the multiplier register has been pulsed to correspond with the multiplier.

6. In an electronic calculating machine, a pulse source, a series of three binary registers for receiving the values of the terms of a mathematical process, two of said registers being arranged for reverse operation to reduce to zero the terms therein when connected to said pulse source, and the third for forward operation to accumulate a result, separate zero test circuits for said two registers, a pulsing circuit for one of the reversed registers made operative by the zero test circuit for the other reversed register to pulse said one reversed register each time said other reversed register reaches zero, means made effective by the zero test circuit for said other reversed register for restoring to said other reversed register its starting value each time it is reduced to zero, including means for storing the starting value while said other register is being reduced to zero; and circuits connecting said pulse source to said other register and said third register, including switch means for opening said connecting circuits when said one register reaches zero.

7. An electronic calculating machine comprising a series of binary registers for receiving the values of the terms of a mathematical process, two of said registers being arranged for reverse operation to reduce to zero the terms therein when connected to said pulse source and the third being arranged for forward operation to accumulate a result; separate zero test circuits for said two registers, a pulsing circuit for the forwardly operating register made operative by the zero test circuit for one of the reversed registers to pulse said forwardly operating register each time said one reversed register reaches zero, means made effective by the zero test circuit for said one reversed register for restoring to said one reversed register its starting value each time it is reduced to zero, including means to store the starting value while said one register is being reduced to zero; and circuits connecting said pulse source to said one register and said third register, including switch means for opening said connecting circuits when said third register reaches zero.

8. In a calculating machine, a series of registers for the multiplicand, multiplier, and product, said multiplicand and multiplier registers normally being conditioned to subtract and the product register conditioned to add, means to continuously drive the lowest orders of the multiplicand and product registers, means to enter the factors of multiplication in the multiplicand and multiplier registers; separate means associated with the multiplicand and multiplier registers for detecting zero status thereof, means rendered effective by the zero multiplicand detecting means for causing a single unit to be entered in the multiplier register each time the multiplicand register reaches zero, means rendered effective by the multiplicand zero detecting means for restoring the multiplicand to the multiplicand register each time the latter reaches zero, and means rendered operative by the multiplier zero detecting means for disconnecting the multiplicand and product registers from the driving means.

9. In a calculating machine, a series of registers for the multiplicand, multiplicand storage, multiplier, and product, said multiplicand and multiplier registers normally being conditioned to subtract and the product register conditioned to add, means to continuously drive the lowest orders of the multiplicand and product registers, means to enter the factors of multiplication in the multiplicand, storage, and multiplier registers; separate means associated with the multiplicand and multiplier registers for detecting zero status thereof, means rendered effective by the zero multiplicand detecting means for causing a single unit to be entered in the multiplier register each time the multiplicand register reaches zero, means rendered effective by the multiplicand zero detecting means for transferring the multiplicand from the storage register to the multiplicand register each time the latter reaches zero, and means rendered operative by the multiplier zero detecting means for disconnecting the multiplicand and product registers from the driving means.

10. In a calculating machine, a series of registers for the divisor, quotient, and dividend, said divisor and dividend registers normally being conditioned to subtract and the quotient register conditioned to add, means to continuously drive the lowest orders of the divisor and dividend registers; means to enter the factors of division in the divisor, and dividend registers; separate means associated with the divisor and dividend registers for detecting zero status thereof, means rendered effective by the divisor zero detecting means for causing a single unit to be entered in the quotient register each time the divisor register reaches zero, means rendered effective by the divisor zero detecting means for restoring the divisor to the divisor register each time the latter reaches zero, including means to store the divisor while the divisor register is being reduced to zero; and means rendered operative by the dividend zero detecting means for disconnecting the divisor and dividend registers from the driving means.

11. In a calculating machine, a series of registers for the divisor, divisor storage, quotient, and dividend, said divisor and dividend registers normally being conditioned to subtract and the quotient register conditioned to add, means to continuously drive the lowest orders of the divisor and dividend registers, means to enter the factors of division in the divisor, storage, and dividend registers; separate means associated with the divisor and dividend registers for detecting zero status thereof, means rendered effective by the zero divisor detecting means for causing a single unit to be entered in the quotient register each time the divisor register reaches zero, means rendered effective by the divisor zero detecting means for transferring the divisor from the storage register to the divisor register each time the latter reaches zero, and means rendered operative by the dividend zero detecting means for disconnecting the multiplier and dividend registers from the driving means.

12. In an electronic calculating machine a pair of electronic counters, each comprising a plurality of binary trigger stages including an input stage and circuits for coupling said stages for forward and reverse operation of the counters, one of said counters receiving a factor of computation and the other for computing a result, a third counter for a different factor of computation comprising binary trigger stages intercoupled for reverse operation, said counters each having a zero signal circuit, the zero signal circuit of the third counter being connected to the input stage of one of said pairs of counters, a pulse source, pulsing circuits connecting the pulse source to the input stages of the two factor receiving counters and including gates responsive to either of the zero signal circuits of the first two counters.

13. The invention set forth in claim 12 wherein selective means is provided to reverse the effect of the coupling circuits for said pair of counters.

14. In a calculating machine, an MC–DR register, a PR–DD register, an MP–Q register, each register having a units order input stage and a zero signal circuit responsive to a change of its register to zero in all orders, said MC–DR register normally substracting, said PR–DD and MP–Q registers each being selectively conditionable to either add or subtract; a pulse source; separate pulsing circuits one for each of said input stages and each including a pulse gate, one of said pulsing circuits being connected to the input stage of the MP–Q register and to the zero signal circuit of the MC–DR register to effect the entry of a unit in the MP–Q register each time the MC–DR register reaches zero, and the other pulsing circuits connecting said pulse source to the input stages of the MC–DR and PR–DD registers; starting circuits controlling the pulse gates for the MC–DR and the PR–DD registers to initiate a continuous pulsing of the MC–DR and PR–DD registers and an intermittent pulsing of the MP–Q register, connection enabling the zero signal circuits for the MP–Q and PR–DD registers to disable the gates to stop pulsing of the registers, and means to selectively condition the PR–DD register to add and the MP–Q register to subtract or, alternatively, to condition the PR–DD register to subtract and the MP–Q register to add.

15. In a calculating machine, a multiplicand register, a product register, a multiplier register, each register having a units order input stage and a zero signal circuit responsive to a change of its register to zero in all orders, said multiplicand register and multiplier register normally subtracting, said product register being conditioned to add; a pulse source; separate pulsing circuits, one for each of said input stages and each including a pulse gate, one of said pulsing circuits being connected to the input stage of the multiplier register and to the zero signal circuit of the multiplicand register to effect the entry of a unit in the multiplier register each time the multiplicand register reaches zero, and the other pulsing circuits connecting said pulse source to the input stages of the multiplicand and product registers; starting circuits controlling the pulse gates for the multiplicand and the product registers to initiate a continuous pulsing of the multiplicand and product registers and an intermittent pulsing of the multiplier register, and connections enabling the zero signal circuit for the multiplier register to disable the gates to stop pulsing of the registers.

16. In a calculating machine, a divisor register, a dividend register, a quotient register, each register having a units order input stage and a zero signal circuit responsive to a change of its register to zero in all orders, said divisor register and dividend register normally subtracting, said quotient register being conditioned to add; a pulse source; separate pulsing circuits, one for each of said input stages and each including a pulse gate, one of said pulsing circuits being connected to the input stage of the quotient register and to the zero signal circuit of the divisor register to effect the entry of a unit in the quotient each time the divisor register reaches zero, and the other pulsing circuits connecting said pulse source to the input stages of the divisor and dividend registers; starting circuits controlling the pulse gates for the divisor and dividend registers to initiate a continuous pulsing of the divisor and dividend registers and an intermittent pulsing of the quotient register, and connections enabling the zero signal circuit for the dividend register to disable the gates to stop pulsing of the registers.

17. In a calculating machine, a series of three electronic registers each having a units order input stage and a circuit responsive to a change to zero status of all the orders of the register, pulsing circuits for two of said registers including pulse gates opened and closed by the zero circuits for one of said two registers and the third register, a single pulse circuit connected to the input stage of the third register and to the zero circuit of one of said two registers to effect the entry of a unit in the third register each time said one of two registers reaches zero, and starting circuits initially operative to open said pulse gates and rendered effective by the zero circuits of said two registers to close said gates.

References Cited in the file of this patent

UNITED STATES PATENTS

| | | |
|---|---|---|
| 2,093,529 | Tauschek | Sept. 21, 1937 |
| 2,176,932 | Smith | Oct. 24, 1939 |
| 2,624,508 | Dickinson et al. | Jan. 6, 1953 |
| 2,641,407 | Dickinson | June 9, 1953 |